(12) United States Patent
Park et al.

(10) Patent No.: US 11,042,186 B2
(45) Date of Patent: Jun. 22, 2021

(54) ELECTRONIC DEVICE AND CONTROL METHOD THEREOF FOR CHANGING USER INTERFACE WHEN DEVICE IS UNDER WATER

(71) Applicant: SAMSUNG ELECTRONICS CO., LTD., Suwon-si (KR)

(72) Inventors: Je-Heon Park, Hwaseong-si (KR); Seung-Woo Shin, Yongin-si (KR); Kum-Hyun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/819,184

(22) Filed: Nov. 21, 2017

(65) Prior Publication Data
US 2018/0157368 A1    Jun. 7, 2018

(30) Foreign Application Priority Data
Dec. 1, 2016    (KR) .......................... 10-2016-0163005

(51) Int. Cl.
| | |
|---|---|
| *G06F 3/044* | (2006.01) |
| *G06F 1/16* | (2006.01) |
| *G06F 3/0488* | (2013.01) |
| *G06F 3/041* | (2006.01) |

(Continued)

(52) U.S. Cl.
CPC .......... *G06F 1/1626* (2013.01); *G06F 3/0484* (2013.01); *G06F 3/04142* (2019.05); *G06F 3/04162* (2019.05); *G06F 3/04886* (2013.01); *G06F 3/04817* (2013.01); *G06F 2203/04105* (2013.01); *G06F 2203/04106* (2013.01)

(58) Field of Classification Search
CPC ...... G06F 3/016; G06F 3/0414; G06F 3/0487; G06F 2203/04105
See application file for complete search history.

(56) References Cited

U.S. PATENT DOCUMENTS

| | | | |
|---|---|---|---|
| 2009/0172531 A1 | 7/2009 | Chen et al. | |
| 2009/0207147 A1* | 8/2009 | Perrot | G06F 1/3215 |
| | | | 345/173 |

(Continued)

FOREIGN PATENT DOCUMENTS

| | | |
|---|---|---|
| CN | 105930007 A | 9/2016 |
| KR | 10-2015-0027656 | 3/2015 |

OTHER PUBLICATIONS

International Search Report and Written Opinion dated Mar. 6, 2018 in counterpart International Patent Application No. PCT/KR2017/0013135.

(Continued)

*Primary Examiner* — Sanghyuk Park
(74) *Attorney, Agent, or Firm* — Nixon & Vanderhye P.C.

(57) ABSTRACT

Disclosed is an electronic device. The disclosed electronic device may include: a first sensor and a second sensor; a display configured to display a user interface; and a processor electrically connected with the first sensor, the second sensor, and the display, in which the processor is configured to change a first user interface displayed on the display to a second user interface displayed adjacent to a position of the second sensor and to display the second user interface, based on a result of detection by the first sensor.

11 Claims, 13 Drawing Sheets

(51) Int. Cl.
*G06F 3/0484* (2013.01)
*G06F 3/0481* (2013.01)

(56) References Cited

U.S. PATENT DOCUMENTS

| | | | |
|---|---|---|---|
| 2012/0023450 A1* | 1/2012 | Noto | G06F 3/04886 |
| | | | 715/825 |
| 2012/0032907 A1 | 2/2012 | Koizumi et al. | |
| 2012/0212434 A1 | 8/2012 | Bluemler et al. | |
| 2013/0002581 A1* | 1/2013 | Abe | G06F 3/0416 |
| | | | 345/173 |
| 2014/0253305 A1* | 9/2014 | Rosenberg | G06F 3/016 |
| | | | 340/407.2 |
| 2014/0359438 A1 | 12/2014 | Matsuki | |
| 2015/0009173 A1* | 1/2015 | Rodzevski | G06F 3/04142 |
| | | | 345/174 |
| 2015/0062069 A1 | 3/2015 | Shin et al. | |
| 2015/0145657 A1 | 5/2015 | Levesque et al. | |
| 2015/0149941 A1 | 5/2015 | Itagaki et al. | |
| 2015/0277720 A1* | 10/2015 | Thorson | G06F 3/04847 |
| | | | 345/174 |
| 2016/0036966 A1* | 2/2016 | Ka | G06F 3/04883 |
| | | | 455/566 |
| 2016/0231857 A1 | 8/2016 | Kano et al. | |

OTHER PUBLICATIONS

European Extended Search Report dated Nov. 8, 2019 for EP Application No. 17876298.5.

\* cited by examiner

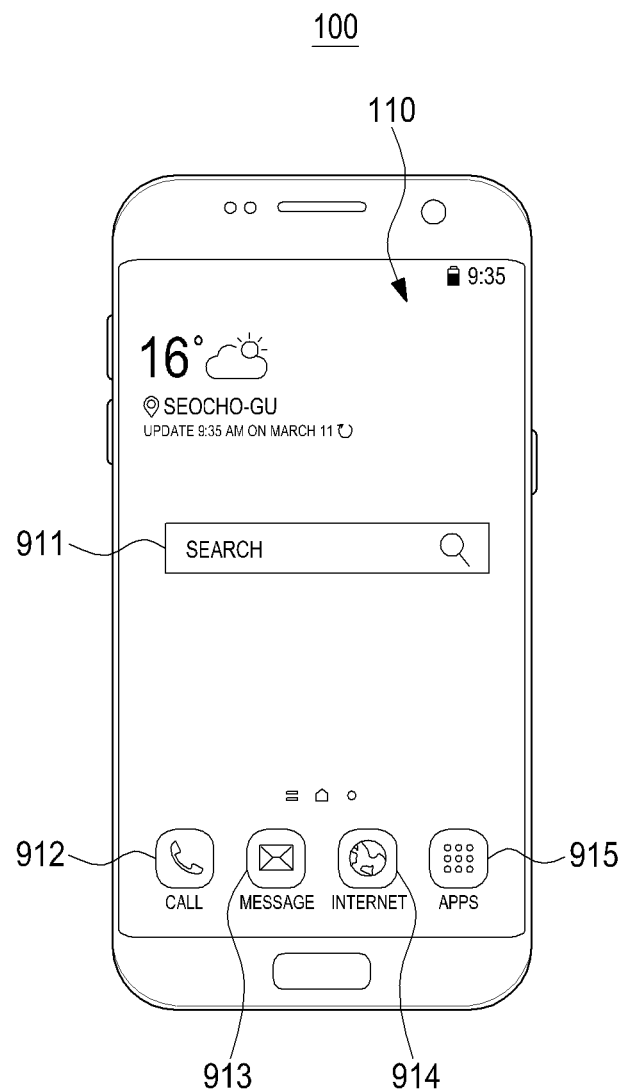
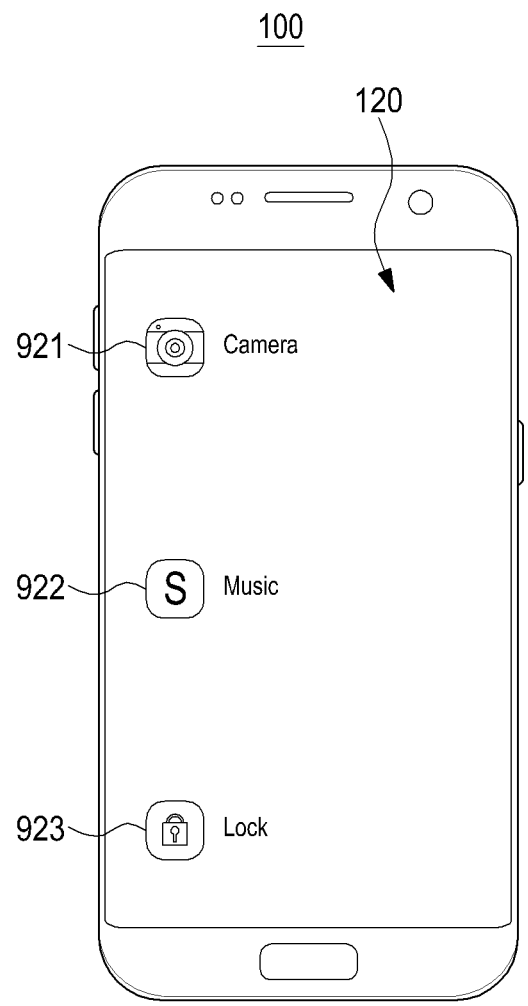
FIG.9A
FIG.9B

ELECTRONIC DEVICE AND CONTROL METHOD THEREOF FOR CHANGING USER INTERFACE WHEN DEVICE IS UNDER WATER

CROSS-REFERENCE TO RELATED APPLICATION

This application is based on and claims priority under 35 U.S.C. § 119 to Korean Application Serial No. 10-2016-0163005, which was filed in the Korean Intellectual Property Office on Dec. 1, 2016, the content of which is incorporated by reference herein in its entirety.

TECHNICAL FIELD

The present disclosure relates generally to an electronic device and control method for changing and displaying a user interface and, for example, to an electronic device and control method for changing a first user interface to a second user interface and displaying the second user interface, based on a result of detection by a first sensor.

BACKGROUND

Recently, due to the rapid supply of electronic devices such as smart phones, society has completely entered the era of one device per person. This means that electronic devices have become a part of users' daily lives, and users are also aware that everyday life is difficult without such electronic devices. This is due in large part to "portability," among various features of electronic devices. In fact, users carry electronic devices for most of their daily lives, and time spent acquiring various information from electronic devices has become a large part of our daily lives.

Moreover, the leisure life of users is not an exception to the above phenomenon. Accordingly, electronic devices provide various functions that attract users not only in their daily lives, but also in their leisure activities (e.g., mountain climbing, tracking, swimming, etc.). For example, electronic devices provide various functions that are useful in leisure life, such as a waterproof function that allows users to use the electronic devices in water with a predetermined water pressure and a dustproof function that protects the electronic devices from dust.

In an electronic device according to the prior art which provides a waterproof function, when the electronic device is located under the water, functions or operations that enable control of the electronic device having the waterproof function cannot be provided under the water.

SUMMARY

The present disclosure provides an electronic device for performing a method that enables the control of the electronic device under the water when it is determined that the electronic device is under the water.

An electronic device according to an example embodiment may include: a first sensor and a second sensor; a display configured to display a user interface; and a processor electrically connected with the first sensor, the second sensor, and the display, in which the processor is configured to change a first user interface displayed on the display to a second user interface displayed adjacent to a position of the second sensor and to display the second user interface, based on a result of detection by the first sensor.

In the electronic device according to an example embodiment, the first sensor may include a display that recognizes a touch, and the second sensor may include at least one touch sensor that uses a piezoelectric element.

In the electronic device according to an example embodiment, the second sensor may include a first piezoelectric element and a second piezoelectric element, and the processor may be configured to perform a preset function based on a voltage displacement detected by the first piezoelectric element and a voltage displacement detected by the second piezoelectric element.

In the electronic device according to an example embodiment, the processor may be configured to perform a first function when the voltage displacement detected by the first piezoelectric element is greater than the voltage displacement detected by the second piezoelectric element and the difference therebetween has a value equal to or greater than a preset value, and may perform a second function when the voltage displacement detected by the first piezoelectric element is greater than the voltage displacement detected by the second piezoelectric element and the difference therebetween has a value less than the preset value.

In the electronic device according to an example embodiment, the processor may be configured to perform a third function when the voltage displacement detected by the second piezoelectric element is greater than the voltage displacement detected by the first piezoelectric element and the difference therebetween has a value equal to or greater than a preset value, and may be configured to perform a fourth function when the voltage displacement detected by the second piezoelectric element is greater than the voltage displacement detected by the first piezoelectric element and the difference therebetween has a value less than the preset value.

In the electronic device according to an example embodiment, the processor may be configured to increase the sensitivity with which the piezoelectric element recognizes a user's touch when a detection value of a touch sensor using the piezoelectric element exceeds a preset value during a preset period.

In the electronic device according to an example embodiment, the number of function execution icons displayed by the first user interface may be greater than the number of function execution icons displayed by the second user interface by a preset number or greater.

In the electronic device according to an example embodiment, the second user interface may display at least one of a camera application, an album application, and a music reproduction application on the display.

A method for controlling an electronic device including a first sensor and a second sensor according to an example embodiment may include: displaying a first user interface; checking a result of detection by the first sensor; and changing the first user interface to a second user interface displayed adjacent to a position of the second sensor and displaying the second user interface, based on the result of detection by the first sensor.

In the method for controlling the electronic device including the first sensor and the second sensor according to an example embodiment, the first sensor may include a display that recognizes a touch, and the second sensor may include at least one touch sensor that uses a piezoelectric element.

In the method for controlling the electronic device including the first sensor and the second sensor according to an example embodiment, the second sensor may include a first piezoelectric element and a second piezoelectric element, and the method may include performing a preset function based on a voltage displacement detected by the first piezoelectric element and a voltage displacement detected by the second piezoelectric element.

In the method for controlling the electronic device including the first sensor and the second sensor according to an example embodiment, performing of the preset function based on the voltage displacement detected by the first piezoelectric element and the voltage displacement detected by the second piezoelectric element may include performing a first function when the voltage displacement detected by the first piezoelectric element is greater than the voltage displacement detected by the second piezoelectric element and the difference therebetween has a value equal to or greater than a preset value, and performing a second function when the voltage displacement detected by the first piezoelectric element is greater than the voltage displacement detected by the second piezoelectric element and the difference therebetween has a value less than the preset value.

In the method for controlling the electronic device including the first sensor and the second sensor according to an example embodiment, performing of the preset function based on the voltage displacement detected by the first piezoelectric element and the voltage displacement detected by the second piezoelectric element may include performing a third function when the voltage displacement detected by the second piezoelectric element is greater than the voltage displacement detected by the first piezoelectric element and the difference therebetween has a value equal to or greater than a preset value, and performing a fourth function when the voltage displacement detected by the second piezoelectric element is greater than the voltage displacement detected by the first piezoelectric element and the difference therebetween has a value less than the preset value.

The method for controlling the electronic device including the first sensor and the second sensor according to an example embodiment may include increasing the sensitivity with which the piezoelectric element recognizes a user's touch when a detection value of a touch sensor using the piezoelectric element exceeds a preset value during a preset period.

In the method for controlling the electronic device including the first sensor and the second sensor according to an example embodiment, the number of function execution icons displayed by the first user interface may be greater than the number of function execution icons displayed by the second user interface by a preset number or greater.

In the method for controlling the electronic device including the first sensor and the second sensor according to an example embodiment, the second user interface may display at least one of a camera application, an album application, and a music reproduction application on the display.

A storage medium including instructions for performing a method for controlling an electronic device including a first sensor and a second sensor according to an example embodiment may include instructions for: displaying a first user interface; checking a result of detection by the first sensor; and changing the first user interface to a second user interface displayed adjacent to a position of the second sensor and displaying the second user interface, based on the result of detection by the first sensor.

According to the present disclosure as described above, it may be possible to provide an electronic device that enables control thereof when the electronic device is located under the water, and a method for controlling the same.

The effects described in the present disclosure are not limited thereto, and it will be apparent to those skilled in the art that various other effects are possible in view of the present disclosure.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein:

FIGS. 9A and 9B are diagrams illustrating another example situation in which an electronic device changes a user interface displayed on a display based on an output of a first sensor according to an example embodiment of the present disclosure;

DETAILED DESCRIPTION

Figure 1A:
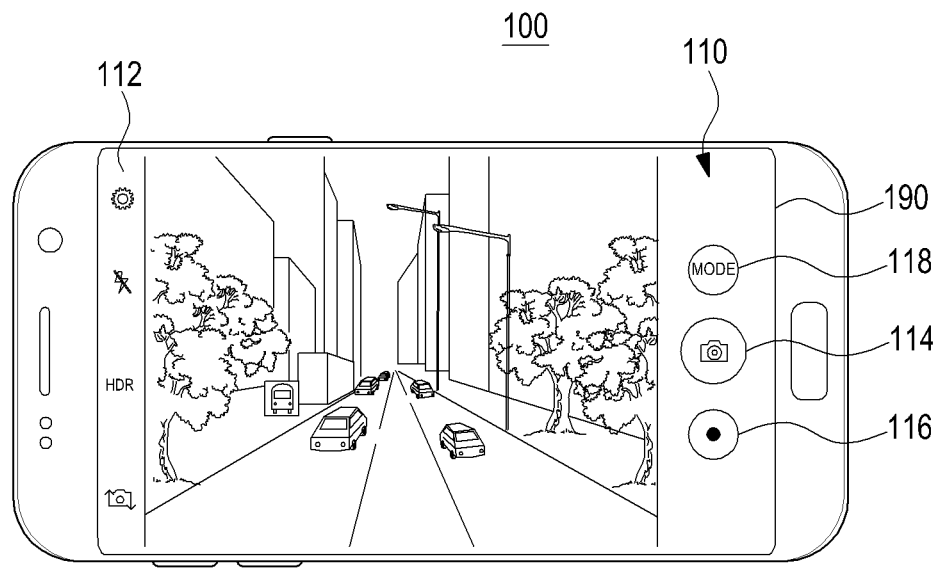
FIGS. 1A and 1B are diagrams illustrating an example situation in which an electronic device changes a user interface displayed on a display, based on an output of a first sensor according to an example embodiment of the present disclosure.

Hereinafter, various example embodiments of the present disclosure will be described with reference to the accompanying drawings. The various example embodiments and the terms used herein are not intended to limit the embodiments disclosed herein to specific forms, and should be understood to include various modifications, equivalents, and/or alternatives to the corresponding embodiments. In describing the drawings, similar reference numerals may be used to designate similar elements. A singular expression may include a plural expression unless they are definitely different in a context. In the present document, expressions, such as "A or B" or "at least one of A and/or B", may include all possible combinations of items listed together. The expression "a first", "a second", "the first", or "the second," used in various embodiments of the present disclosure, may modify various components regardless of the order and/or the importance thereof, without limiting the corresponding components. When an element (e.g., a first element) is referred to as being "(functionally or communicatively) connected," or "directly coupled" to another element (e.g., a second element), the element may be connected directly to the other element, or may be connected to the other element through yet another element (e.g., a third element).

The expression "configured to", as used in various embodiments of the present disclosure, may be interchangeably used with, for example, "suitable for", "having the capacity to", "designed to", "adapted to", "made to", or "capable of" in terms of hardware or software, according to the circumstances. In some situations, the expression "device configured to" may refer to a situation in which the device, together with other devices or components, "is able to". For example, the phrase "processor adapted (or configured) to perform A, B, and C" may refer, for example, and without limitation, to a dedicated processor (e.g., embedded processor) for performing the corresponding operations or a general purpose processor (e.g., a Central Processing Unit (CPU) or an Application Processor (AP)) that can perform the corresponding operations by executing one or more software programs stored in a memory device.

Figure 1B:
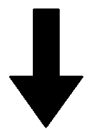

FIGS. 1A and 1B are diagrams illustrating an example situation in which an electronic device changes a user interface displayed on a display, based on an output of a first sensor according to an example embodiment of the present disclosure.

Figure 1B:
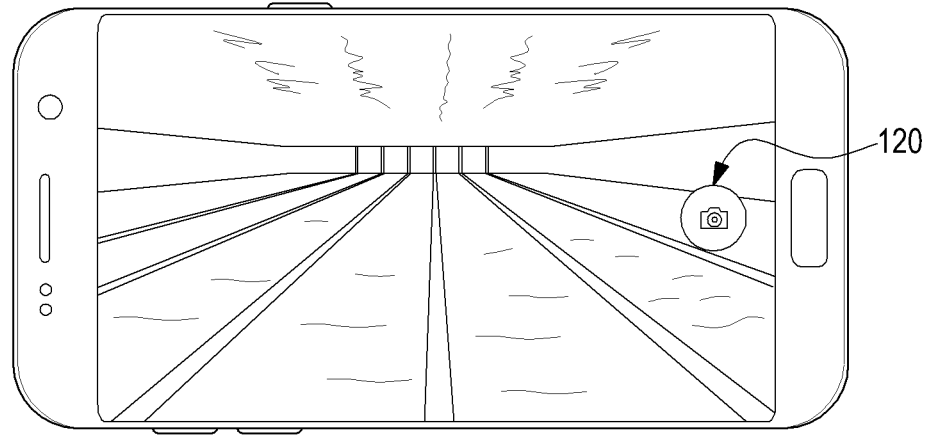

Referring to FIG. 1, an electronic device 100 according to an embodiment may include, for example, at least one of a smart phone, a tablet PC, a mobile phone, a video phone, an electronic book reader, a desktop PC, a laptop PC, a netbook computer, a workstation, a server, a PDA, a portable multimedia player (PMP), an MP3 player, a medical device, a camera, and a wearable device, or the like, but is not limited thereto. The wearable device may include at least one of an accessory type (e.g., a watch, a ring, a bracelet, an anklet, a necklace, glasses, a contact lens, or a Head-Mounted Device (HMD)), a fabric or clothing integrated type (e.g., an electronic clothing), a body-mounted type (e.g., a skin pad or tattoo), and a bio-implantable type circuit, or the like, but is not limited thereto. Hereinafter, for ease of description, it is assumed for illustrative purposes only that the electronic device 100 is a smart phone.

The electronic device 100 may display a first user interface 110 on a display 190. The first user interface 110 may be, for example, a user interface displayed by default when various applications that can be executed by the electronic device 100 are executed.

Referring to FIG. 1A, when the electronic device 100 executes a camera function, the electronic device 100 may display, on the display 190, the first user interface 110 including icons which enable selection and control of various functions associated with photography using a camera.

In the electronic device 100 according to an embodiment, an image that is input through a camera module (not illustrated) may be displayed in the center part of the display 190. In the electronic device 100, various icons 112 that enable modification of a photographing setting value may be displayed, for example, on the left side of the display 190. In addition, in the electronic device 100, a photography icon 114, a moving image photography icon 116, a mode switching icon 118, etc. may be displayed on the right side of the display 190. However, the arrangement of the icons, which is related to the above-described photography, is not limited thereto.

According to an embodiment, the electronic device 100 may include a first sensor (not illustrated) and a second sensor (not illustrated) which is different from the first sensor. The first sensor may be, for example, a capacitive touch panel driven by sensing static electricity generated from a user's body. According to an embodiment of the present disclosure, the display 190 may be a capacitive touch display 190 supporting a user's touch input or hovering input.

According to an embodiment, the electronic device 100 may include a piezoelectric element, which will be described later, as the second sensor. For example, when physical pressure is sensed, the piezoelectric element may generate an electrical signal (e.g., voltage). The piezoelectric element may be disposed adjacent to, for example, the display 190. The driving principle of the piezoelectric element will be described in greater detail below with reference to FIG. 3.

However, the first sensor and the second sensor are not limited to the described capacitive touch display 190 and the piezoelectric element. For example, the first sensor may be a gyro sensor, and the second sensor may be a temperature/humidity sensor. Further, the first sensor may be a grip sensor, and the second sensor may be a UV sensor. Hereinafter, descriptions will be provided based on an illustrative non-limiting example in which the first sensor is a capacitive touch display 190 including a capacitive touch panel and that the second sensor is a piezoelectric element.

Referring to FIG. 1B, the electronic device 100 may change the first user interface 110 displayed in the display 190 to a second user interface 120 and display the second user interface 120, based on a result of detection by the first sensor.

For example, the electronic device 100 may change the first user interface 110 displayed in the display 190 to the second user interface 120 and display the second user interface 120, based on a touch detection result generated on the touch display 190.

For example, when the electronic device 100 enters the water, the capacitive touch display 190 may recognize that a touch occurs in the entire area of the display 190 or that a touch occurs in an area of a predetermined size or larger. In this case, the electronic device 100 may change the first user interface 110 to the second user interface 120 and display the second user interface 120.

The second user interface 120 may be, for example, a user interface in which icons are arranged adjacent to a position of the second sensor.

Referring to FIG. 1B, the electronic device 100 may provide a piezoelectric element adjacent to the right end and the left end of the display 190. The piezoelectric element may be provided inside the electronic device 100. The arrangement of the piezoelectric element will be described in greater detail below with reference to FIG. 4.

Therefore, the electronic device may display the second user interface 120, in which icons associated with photography are arranged, adjacent to the right end and the left end of the display 190. As described above, the piezoelectric element may generate a voltage based on a physical force. Therefore, even in the situation in which the electronic device 100 is under the water and thus the entirety of the display 190 is perceived as being touched, the electronic device 100 may recognize voltage displacement generated by the piezoelectric element when a user presses an icon adjacent to the piezoelectric element.

Accordingly, even in a case where the electronic device 100 is located under the water, a user may, for example, and without limitation, use a camera function of the electronic device 100.

Figure 2:
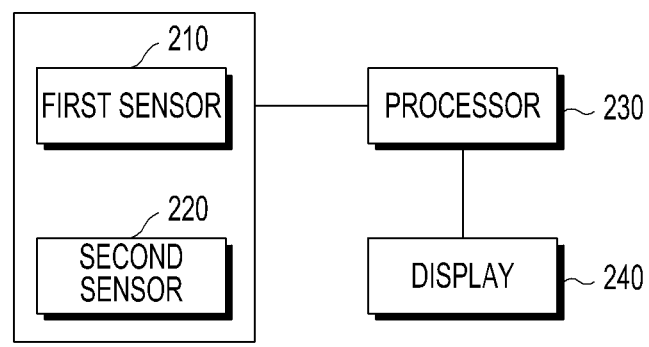
FIG. 2 is a block diagram illustrating an example configuration of an electronic device according to an example embodiment of the present disclosure.

FIG. 2 is a block diagram illustrating an example electronic device according to an example embodiment of the present disclosure.

Referring to FIG. 2, the electronic device 100 according to an embodiment may include a first sensor 210, a second sensor 220, a processor (e.g., including processing circuitry) 230, and a display 240. However, the electronic device 100 may be implemented to have more elements or fewer elements than the elements configured in FIG. 2. For example, the electronic device 100 may include an input module (e.g., input circuitry including, for example, and without limitation, a physical key, a proximity sensor, a biometric sensor, etc.), a power supply, or the like. The display 240 may include the display 190 of FIG. 1.

The first sensor 210 and the second sensor 220, which is different from the first sensor 210, may be various sensors included in the electronic device 100. For example, the first sensor 210 may include a capacitive touch display, and the second sensor 220 may include a piezoelectric element. According to various embodiments, the first sensor 210 may include a gesture sensor, and the second sensor 220 may include an air-pressure sensor. Further, the first sensor 210 may include an acceleration sensor, and the second sensor 220 may include an RGB sensor. However, it will be understood that the first and second sensors are not limited to the examples set forth above.

The first sensor 210 and the second sensor 220 may transmit a detection result or a recognition result to the processor 230. The processor 230 may include various processing circuitry and control various functions of the electronic device 100 based on the detection result or the recognition result, which is transmitted from the first sensor 210 and the second sensor 220.

The processor 230 may include various processing circuitry and control a plurality of hardware or software elements connected thereto and may perform various data processing and calculations by driving an operating system or an application program.

The processor 230 according to an embodiment may display a first user interface pre-stored in a memory (not illustrated) on the display 240. However, the present disclosure is not limited thereto. For example, the processor 230 may receive a user interface, which is stored in a server or a different electronic device from outside, through a communication unit (not illustrated), and display the user interface on the display 240.

The processor 230 may change the first user interface displayed on the display 240 to a second user interface and display the second user interface, based on a detection value or a recognition value received from the first sensor 210. According to another embodiment, before the display of a first user interface intended to be displayed on the display 240, the processor 230 may change the first user interface to a second user interface and display the second user interface, based on a detection value or a recognition value, which is received from the first sensor 210.

The display 240 may include, for example, a Liquid Crystal Display (LCD), a Light Emitting Diode (LED) display, an Organic Light Emitting Diode (OLED) display, a Micro Electro Mechanical System (MEMS) display, or an electronic paper display, or the like, but is not limited thereto. The display 240 may include the display 190 in FIG. 1. The display 240 may include a touch screen and may receive, for example, a touch input, a gesture input, a proximity input, a hovering input using an electronic pen or a user's body part, or the like, but is not limited thereto.

According to an embodiment, the display 240 may change the first user interface to the second user interface and display the second user interface, under the control of the processor 230.

Figure 3:
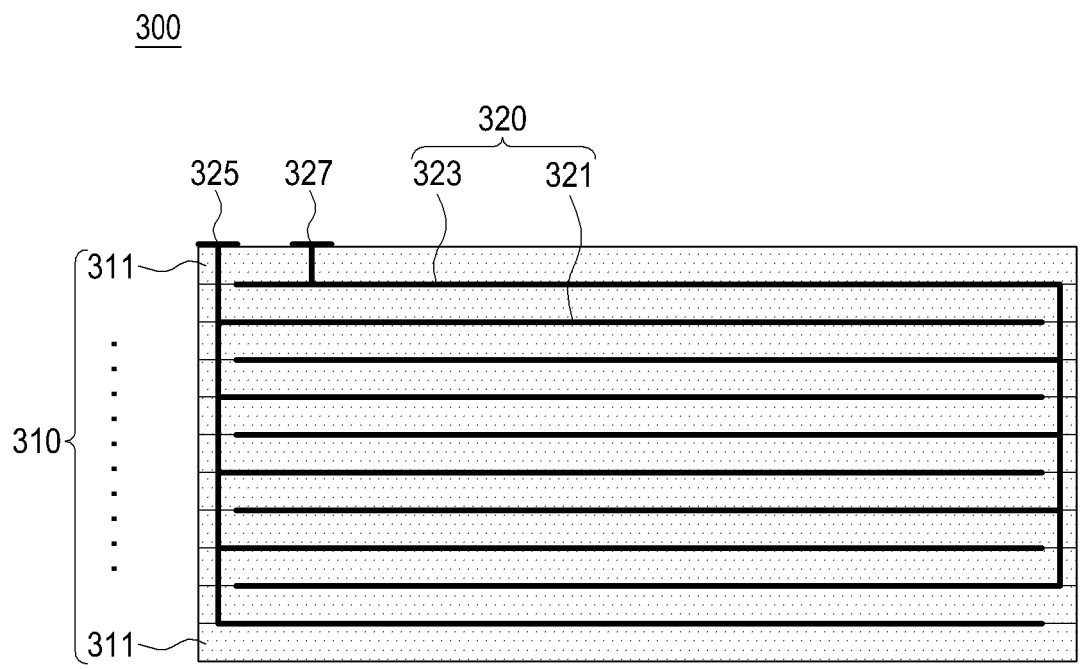
FIG. 3 is a diagram illustrating an example piezoelectric element according to an example embodiment of the present disclosure.

FIG. 3 is a diagram illustrating an example piezoelectric element according to an example embodiment of the present disclosure.

Referring to FIG. 3, a piezoelectric element 300 may include a piezoelectric body 310, in which a plurality of piezoelectric layers 311 are laminated, and an internal electrode 320 including a positive electrode 321 and a negative electrode 323. The positive electrode 321 and the negative electrode 323 may, for example, be alternately arranged between each of the laminated piezoelectric layers 311. Based on this pattern, the piezoelectric element 300 may be structured by lamination.

Each of the plurality of piezoelectric layers 311 may be formed, for example, by laminating a plurality of ceramic sheets. The ceramic sheets may, for example, be prepared by mixing fine ceramic powders (e.g., crystal, zirconium titanate, platinum, barium titanate, etc.) with a binder to produce slurry, and then sintering the slurry by plastic-processing the slurry at a specified temperature for a specific time. In various embodiments, the plurality of piezoelectric layers 311 may include a composite of the ceramic material and a polymeric material (e.g., polymer, rubber, etc.), or the like, but are not limited thereto.

The internal electrode 320 may, for example, include a metallic material (e.g., a silver (Ag)-palladium (Pd) alloy, etc.) in consideration of conductivity. In an embodiment, the internal electrode 320 may be printed on one area of the ceramic sheet constituting the plurality of piezoelectric layers 311, based on a screen printing technique, but is not limited thereto.

According to an embodiment, the piezoelectric element 300 may generate an electrical signal when a physical displacement is input from the outside. For example, the piezoelectric element 300 may generate a voltage based on compression or tension input from the outside.

Further, in the piezoelectric elements 300, electrodes having the same polarity within the piezoelectric element 300 (e.g., the positive electrodes 321 or the negative electrodes 323) may be electrically connected to each other, and thus may be connected to a positive electrode terminal 325 or a negative electrode terminal 327, which is formed to be exposed as one area of the piezoelectric element 300. The positive electrode terminal 325 and the negative electrode terminal 327 may be electrically connected with a specific element (e.g., a power supply device) of the electronic device, which will be described later, and may thus receive power for operating the piezoelectric device 300. The piezoelectric element 300 may generate a physical displacement (e.g., vibration) based on power applied to the piezoelectric body 310 (or the plurality of piezoelectric layers 311) through the internal electrode 320. Further, the piezoelectric element 300 may sense the generated physical displacement.

According to an embodiment, the piezoelectric element 300 may apply the generated physical displacement to any substrate in contact therewith or adjacent thereto. In this case, a displacement corresponding to the physical displacement of the piezoelectric element 300 may be generated in the substrate, and a sound corresponding to a frequency band of the displacement may be output.

Figure 4A:
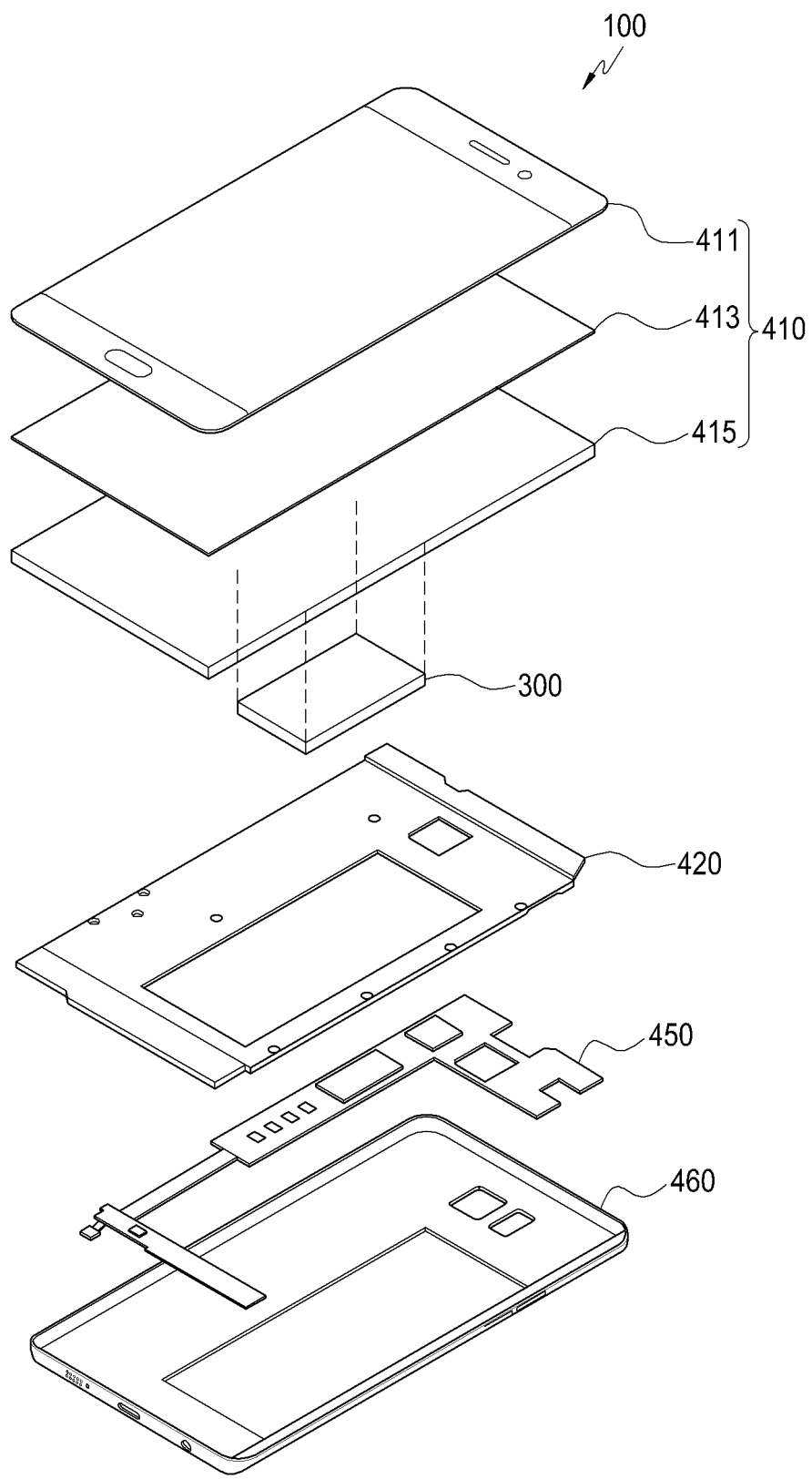
FIGS. 4A and 4B are exploded perspective views illustrating an example configuration of an electronic device including a piezoelectric element according to an example embodiment of the present disclosure.
Figure 4B:
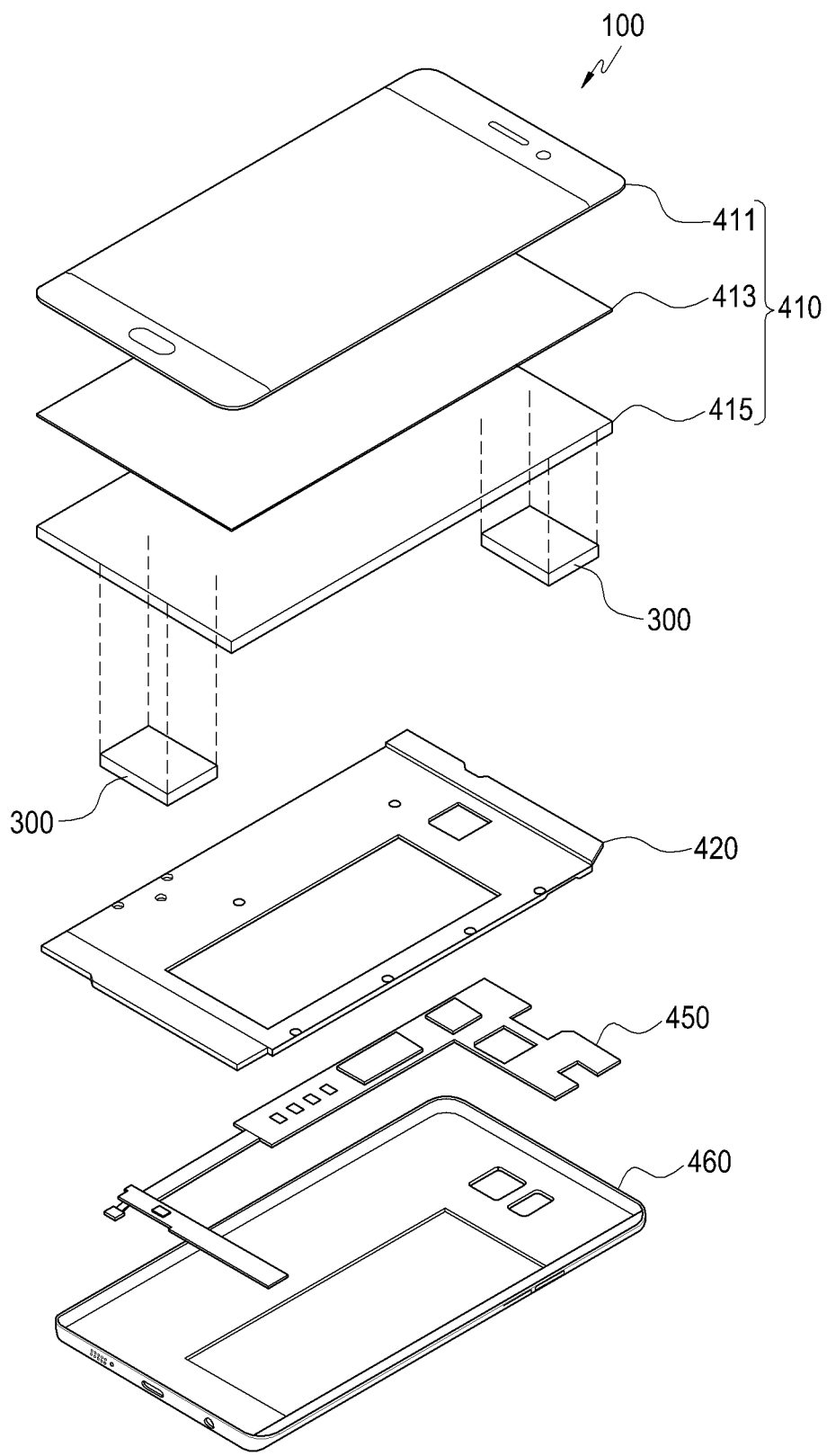

FIGS. 4A and 4B are exploded perspective views illustrating an example configuration of an electronic device including a piezoelectric element according to an example embodiment of the present disclosure.

Referring to FIG. 4A and FIG. 4B, the electronic device 100 may, for example, and without limitation, include a display 410, at least one piezoelectric element 300, a support member 420, a printed circuit board 450, and a housing 460. In some embodiments, the electronic device 100 may omit at least one of the elements described above, or may additionally include other elements.

For example, the electronic device 100 may further include a communication module including various communication circuitry for configuring wired or wireless communication with an external device, and a power supply device (e.g., a battery) for supplying driving energy to elements. The wireless communication may be, for example, a cellular communication protocol including at least one of Long-Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile Communications (GSM). In addition, the wireless communication may also include short-range communication, such as Wireless Fidelity (Wi-Fi), Bluetooth, Near-Field Communication (NFC), and magnetic stripe transmission (MST).

The housing 260 may form the exterior of the electronic device 100 and accommodate the elements described above at the same time. The housing 460 may include a bottom surface oriented in a first direction, and at least one side surface extending at a predetermined angle (e.g., perpendicular) from the edge of the bottom surface. Further, the housing 460 may include a top surface which faces the first direction and corresponds to upper ends of the side surfaces. The inner area of the top surface may be open, whereby the housing 460 may form an inner space in which at least a part of the area is open.

The display 410 may output any screen (e.g., an application execution screen, a home screen, etc.) corresponding to a user control or designated scheduling information. In this regard, the display 410 may receive a signal for an input event (e.g., a touch, a drag, etc.) generated by a user body (e.g., a finger) or an electronic pen interacting with the electronic device 100. The display 410 may output a screen relating to the input event, which has been processed by another element (e.g., a processor 230). The screen may include, for example, at least one user interface, a content (e.g., text, image, video, icon, widget, symbol, etc.), and the like. In relation to performing functions described above, the display 410 may include, for example, a cover glass 411, an input event detection panel 413, and a display panel 415. The display 410 may include the display 190 of FIG. 1 and the display 240 of FIG. 2.

The cover glass 411 may be disposed above the display panel 415 and transmit light generated by the display panel 415. Further, an input event made by means of the above-described electronic pen or the user body may be applied on the cover glass 411. In an embodiment, the cover glass 411 may be received in the inner space of the housing 460, in which the cover glass 411 is disposed such that at least a part thereof is exposed to an open area of the housing 460. At least a portion of the area of the cover glass 411, which is inserted into the inner space, may be combined with or adhered to the housing 460 so as to finish the opened housing 460.

The input event detection panel 413 may detect a signal for the input event applied on the cover glass 411, output the detected signal as an electrical signal, and transfer the electrical signal to the processor 230. The input event detection panel 413 may detect coordinates for the input event by sensing, based on at least one electrode layer and a control circuit, a change in a physical quantity (e.g., voltage or capacitance) of an electrode layer, due to application of the input event. In an embodiment, the input event detection panel 413 may include a touch panel or a digitizer.

The display panel 415 may output a screen. In an embodiment, the display panel 415 may include the described input event detection panel 413. Further, the display panel 415 may include at least one of a liquid Crystal Display (LCD) display, a Light-Emitting Diode (LED) display, an Organic Light Emitting Diode (OLED) display, a micro-electromechanical system (MEMS) display, and an electronic paper display, or the like, but is not limited thereto.

At least one piezoelectric element 300 may sense a pressure of an input event applied on at least a portion of the area of the cover glass 411 and transfer the sensed pressure of the input event to the processor 230. For example, the piezoelectric element 300 may sense the pressure applied from the outside of the cover glass 411, generate a voltage, and transfer the voltage to the processor 230. At least one piezoelectric element 300 may transfer a physical displacement (e.g., vibration) caused by the applied voltage to another element of the electronic device. For example, at least one piezoelectric element 300 may be adhered below the display panel 415 so as to transfer the vibration to the display panel 415.

In an embodiment, at least one piezoelectric element 300 may be a single piezoelectric element. Referring to FIG. 4A, the single piezoelectric element may be disposed in a designated area (e.g., one side edge) below the display panel 415, or may be disposed in any area determined in consideration of structural relationships with other elements. In an embodiment, since the single piezoelectric element may sense pressure in at least a portion of the area of the cover glass 411, the single piezoelectric element may be formed to be smaller than the display panel 415 in the interests of cost savings and weight reduction.

Referring to FIG. 4B, in another example embodiment, the at least one piezoelectric element 300 may include a plurality of piezoelectric elements 300. The plurality of piezoelectric elements 300 may be arranged below the display panel 415, and may face each other at a predesignated distance. The predesignated distance may be modified according to a condition (e.g., an area of the cover glass 411, etc.) for the electronic device 100. Accordingly, the arrangement for the plurality of piezoelectric elements 300 is not limited to that illustrated in FIG. 4B. In an embodiment, when some of the plurality of piezoelectric elements generate physical displacements (e.g., vibration), the remaining piezoelectric elements may measure voltage displacement of the electronic device 100 according to the physical displacements.

A support member 420 (e.g., a bracket) may be disposed below the piezoelectric element 300 so as to support the piezoelectric element 300 and/or the display 410. In an embodiment, the support member 420 may be bound to the piezoelectric element 300 using a separate coupling member (e.g., a screw, a band, etc.). In this case, the support member 420 may assist in realizing firm contact between the piezoelectric element 300 and the display 410.

On the printed circuit board 450, not only the memory and the processor but also a circuit line, various electronic components (e.g., a communication module, a camera module, etc.) associated with operation of the electronic device 100, and the like are mounted thereon. In an embodiment, the printed circuit board 450 may have a characteristic of being flexible. Further, a plurality of printed circuit boards 450 may be configured, and at least some of the plurality of printed circuit boards 450 may be laminated and electrically connected to each other.

Figure 5A:
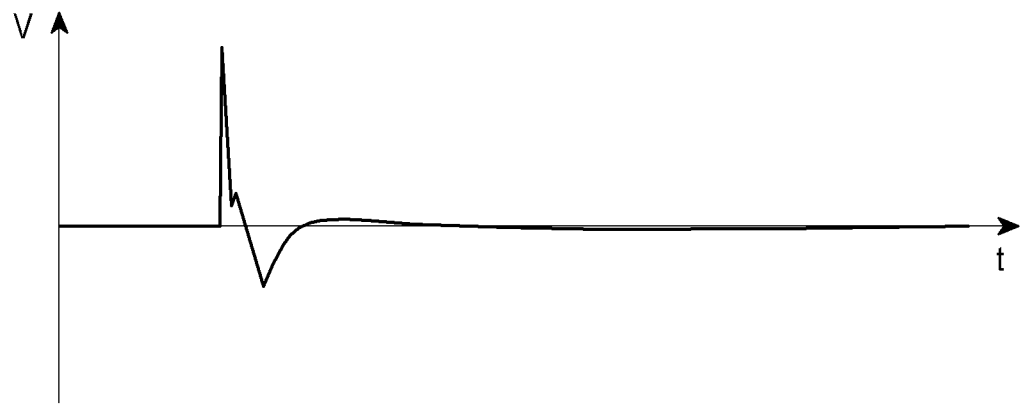
FIGS. 5A, 5B and 5C are graphs illustrating an example situation in which a voltage is generated based on various physical displacements input to a piezoelectric element included in an electronic device according to an example embodiment of the present disclosure.
Figure 5B:
Figure 5C:
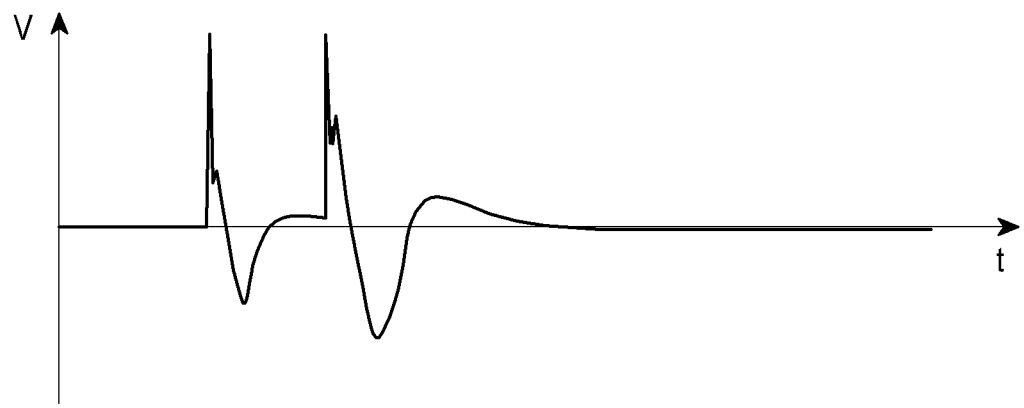

FIGS. 5A, 5B and 5C are graphs illustrating an example situation in which a voltage is generated based on various physical displacements input to a piezoelectric element included in an electronic device according to an example embodiment of the present disclosure.

Referring to FIGS. 5A, 5B and 5C, a horizontal axis of a graph may be time, and a vertical axis of the graph may be voltage.

FIG. 5A is a graph illustrating an example in which a touch input is generated in the piezoelectric element 300 for a short time. The touch input for a short time may be a time shorter than a preset time, for example, and without limitation, a touch input for a time shorter than a time of about 0.4 seconds. When a touch input of shorter than about 0.4 seconds is generated in the piezoelectric element 300, the piezoelectric element 300 may instantaneously generate a voltage. The generated voltage may be maintained for a short time and then disappear.

FIG. 5B is a graph illustrating an example in which a touch input is generated in the piezoelectric element 300 for a relatively long time. The touch input for a relatively long time may correspond to a time longer than a preset time, for example, and without limitation, a touch input for a time longer than a time of about 0.4 seconds. When a touch input is generated in the piezoelectric element 300 for a long time, the piezoelectric element 300 may generate an instantaneous voltage at the start of an input. While the touch is maintained, a slight level of voltage displacement may occur in the piezoelectric element 300. At the time when the touch is terminated, the piezoelectric element 300 may generate a voltage in the direction opposite the direction thereof at the time when the touch was commenced.

FIG. 5C is a graph illustrating an example in which a continuous touch is input to the piezoelectric element 300. For example, the continuous touch input may be a case where the touch input for a short time, which is described in FIG. 5A, is repeatedly performed. When a first touch is input to the piezoelectric element 300, the piezoelectric element 300 may instantaneously generate a voltage. Before a second touch is input, the piezoelectric element 300 may generate a voltage in an opposite direction and stop generating the voltage. When the second touch is input, the piezoelectric element 300 may instantaneously generate a voltage in the same manner as the input of the first touch, generate the voltage in an opposite direction, and then terminate the voltage generation.

According to an embodiment, the piezoelectric element may generate a voltage based on a physical input without a separate power input. Therefore, for example, even in a state where power is not supplied to the piezoelectric element 300, the input event detection panel 413, or the display panel 415, the electronic device 100 may perform various functions based on the voltage generated from the piezoelectric element 300.

In addition, the electronic device 100 may distinguish various inputs, such as a touch input, a long touch input, and a double touch input, based on the above-described voltage displacement patterns, and perform corresponding functions.

Figure 6A:
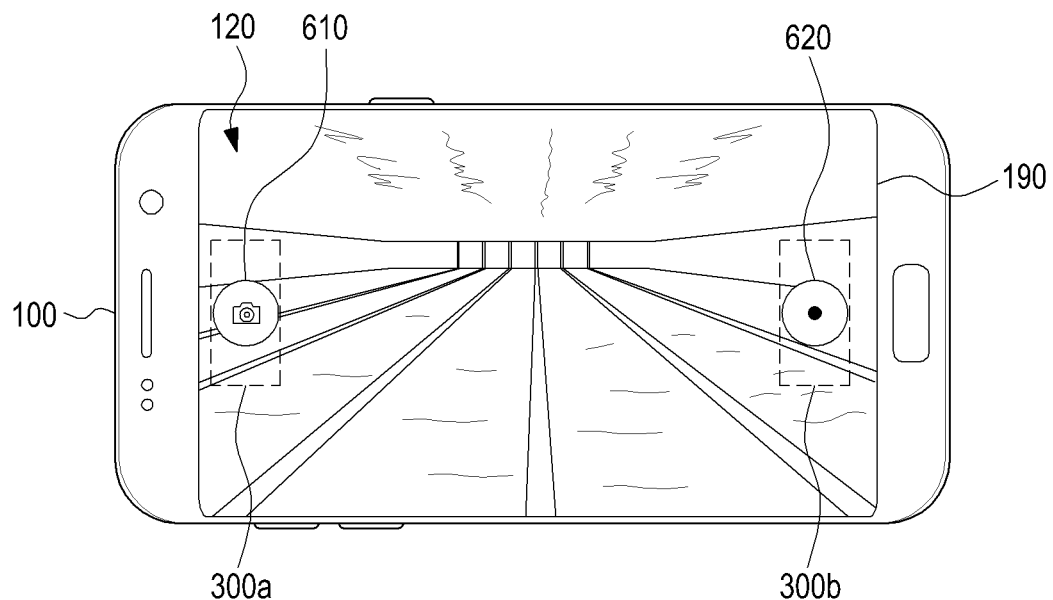
FIGS. 6A, 6B and 6C are diagrams illustrating an example situation in which an electronic device performs different functions according to a position of a piezoelectric element according to an example embodiment of the present disclosure.
Figure 6B:
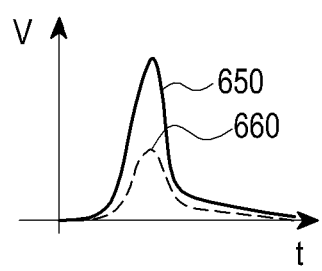
Figure 6C:
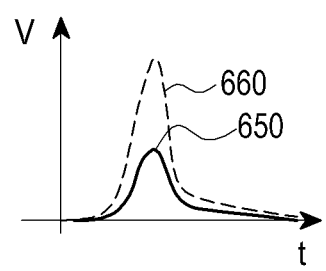

FIGS. 6A, 6B and 6C are diagrams illustrating an example situation in which an electronic device performs different functions depending on a position of a piezoelectric element according to an example embodiment of the present disclosure. Referring to FIG. 6A, the electronic device 100 may display the second user interface 120. For example, the electronic device 100 may display the second user interface 120 on the display 190 when it is determined that the electronic device 100 is located under the water.

According to an embodiment, the electronic device 100 may include at least one piezoelectric element 300. The electronic device 100 may provide the piezoelectric element 300 adjacent to the right end and the left end of the display 190. The electronic device 100 may display the second user interface 120 in which icons are arranged based on a position of the piezoelectric element 300.

For example, the electronic device 100 may display a still image photography icon 610 adjacent to a position at which a first piezoelectric element 300a is positioned, and may display a moving image photography icon 620 adjacent to a position at which a second piezoelectric element 300b is positioned. That is, the second user interface 120 may be a user interface in which the icons 610 and 620 are arranged adjacent to the positions of the piezoelectric elements 300a and 300b so that it is possible to operate the electronic device 100 under the water.

Referring to FIGS. 6B and 6C, the electronic device 100 may perform a preset function based on a voltage displacement pattern of a signal output from the piezoelectric elements 300a and 300b.

When the electronic device 100 confirms that a touch signal input is generated in an area adjacent to the still image photography icon 610, the electronic device 100 may obtain a voltage displacement graph like the graph illustrated in FIG. 6B. That is, when a user touches the vicinity of the still image photography icon 610, each of the first piezoelectric element 300a and the second piezoelectric element 300b may generate voltage displacement. However, the voltage displacement 650 generated by the first piezoelectric element 300a adjacent to the still image photography icon 610 may be larger than the voltage displacement 660 generated by the second piezoelectric element 300b. Therefore, in this case, the electronic device 100 may assume that the touch of the user has occurred adjacent to the first piezoelectric element 300a, and may perform a still image photography function matched to the first piezoelectric element 300a.

When the user touches the vicinity of the moving image photography icon 620, the electronic device 100 may obtain a voltage displacement graph like the graph illustrated in FIG. 6C. That is, when the user touches the vicinity of the moving image photography icon 620, each of the first piezoelectric element 300a and the second piezoelectric element 300b may generate voltage displacement. However, the voltage displacement 660 generated by the second piezoelectric element 300b adjacent to the moving image photography icon 620 may be larger than the voltage displacement 650 generated by the first piezoelectric element 300a. Therefore, in this case, the electronic device 100 may assume that the touch of the user has occurred adjacent to the second piezoelectric element 300b, and may perform a moving image photography function matched to the second piezoelectric element 300b.

FIGS. 7A, 7B, 7C, 7D and 7E are diagrams illustrating an example situation in which an electronic device distinguishes a case where a touch input occurs when a piezoelectric element is not present, and performs different functions depending on a touch input position according to an example embodiment of the present disclosure.

Figure 7A:
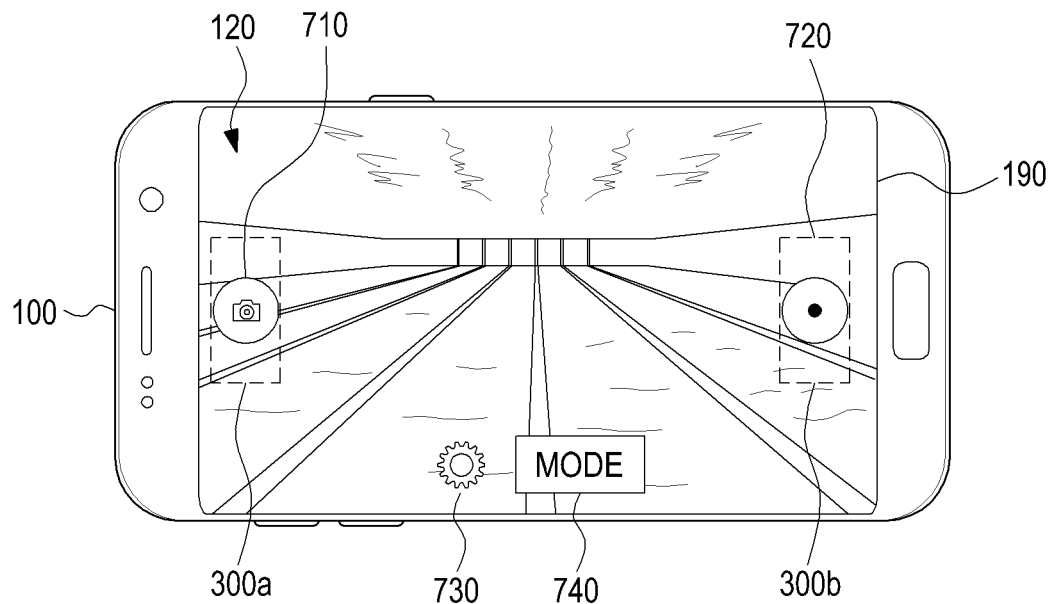
FIGS. 7A, 7B, 7C, 7D and 7E are diagrams illustrating an example situation in which an electronic device distinguishes a case where a touch input occurs when a piezoelectric element is not present, and performs different functions depending on a touch input position according to an example embodiment of the present disclosure.

Referring to FIG. 7A, the electronic device 100 may display the second user interface 120. For example, the electronic device 100 may display the second user interface 120 on the display 190 when it is determined that the electronic device 100 is located under the water.

According to an embodiment, the electronic device 100 may include at least one piezoelectric element 300. The electronic device 100 may provide the piezoelectric element 300 adjacent to the right end and the left end of the display 190. The electronic device 100 may display the second user interface 120 in which icons are arranged based on a position of the piezoelectric element 300.

For example, the electronic device 100 may display a still image photography icon 710 adjacent to a position at which the first piezoelectric element 300a is positioned, and may display a moving image photography icon 720 adjacent to a position at which the second piezoelectric element 300b is positioned. In addition, the electronic device 100 may display a setting icon 730 and a mode icon 740 at positions where the first piezoelectric element 300a and the second piezoelectric element 300b are not located.

Referring to FIG. 7B to FIG. 7E, the electronic device 100 may perform a preset function based on a voltage displacement pattern of a signal output from the piezoelectric elements 300a and 300b.

Figure 7B:
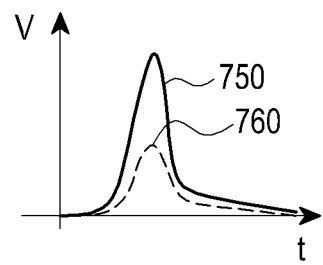

When the electronic device 100 confirms that a touch signal input is generated in an area adjacent to the still image photography icon 710, the electronic device 100 may obtain a voltage displacement graph like the graph illustrated in FIG. 7B. That is, when a user touches the vicinity of the still image photography icon 710, each of the first piezoelectric element 300a and the second piezoelectric element 300b may generate voltage displacement. However, the voltage displacement 750 generated by the first piezoelectric element 300a adjacent to the still image photography icon 710 may be larger than the voltage displacement 760 generated by the second piezoelectric element 300b. Therefore, in this case, the electronic device 100 may assume that a touch of the user has occurred adjacent to the first piezoelectric element 300a, and may perform a still image photography function matched to the first piezoelectric element 300a.

Figure 7C:
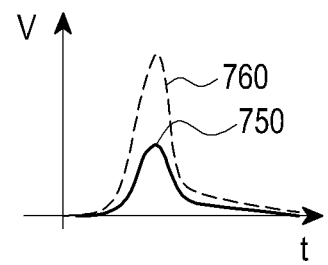

When the user touches the vicinity of the moving image photography icon 720, the electronic device 100 may obtain a voltage displacement graph like the graph illustrated in FIG. 7C. That is, when the user touches the vicinity of the moving image photography icon 720, each of the first piezoelectric element 300a and the second piezoelectric element 300b may generate voltage displacement. However, the voltage displacement 760 generated by the second piezoelectric element 300b adjacent to the moving image photography icon 720 may be larger than the voltage displacement 750 generated by the first piezoelectric element 300a. Therefore, in this case, the electronic device 100 may assume that the touch of the user has occurred adjacent to the second piezoelectric element 300b, and may perform a moving image photography function matched to the second piezoelectric element 300b.

Figure 7D:
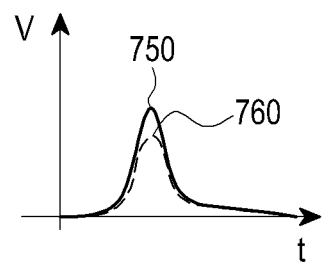

When the user touches the vicinity of the setting icon 730, the electronic device 100 may obtain a voltage displacement graph like the graph illustrated in FIG. 7D. That is, when the user touches the vicinity of the setting icon 730, each of the first piezoelectric element 300a and the second piezoelectric element 300b may generate voltage displacement. At this time, the setting icon 730 is positioned at a distance from each of the first piezoelectric element 300a and the second piezoelectric element 300b, but may be positioned closer to a position where the first piezoelectric element 300a is positioned.

Therefore, all of the voltage displacements generated by the first piezoelectric element 300a and the second piezoelectric element 300b may be lowered. Further, the voltage displacement 750 generated by the first piezoelectric element 300a may be larger than the voltage displacement 760 generated by the second piezoelectric element 300b. Therefore, in this case, the electronic device 100 may assume that the touch of the user is generated at a position distant from the first piezoelectric element 300a but further distant from the second piezoelectric element 300b, and may perform a setting function matching the corresponding position.

Figure 7E:
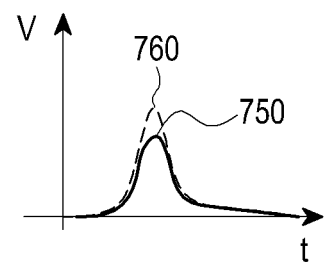

When the user touches the vicinity of the mode icon 740, the electronic device 100 may obtain a voltage displacement graph like the graph illustrated in FIG. 7E. That is, when the user touches the vicinity of the mode icon 740, each of the first piezoelectric element 300a and the second piezoelectric element 300b may generate voltage displacement. At this time, the mode icon 740 is positioned at a distance from each of the first piezoelectric element 300a and the second piezoelectric element 300b, but may be positioned closer to a position where the second piezoelectric element 300b is positioned.

Therefore, all of the voltage displacements generated by the first piezoelectric element 300a and the second piezoelectric element 300b may be lowered. Further, the voltage displacement 760 generated by the second piezoelectric element 300b may be larger than the voltage displacement 750 generated by the first piezoelectric element 300a. Therefore, in this case, the electronic device 100 may assume that the touch of the user is generated at a position distant from the second piezoelectric element 300b but further distant from the first piezoelectric element 300a, and may perform a mode function matching the corresponding position.

Figure 8A:
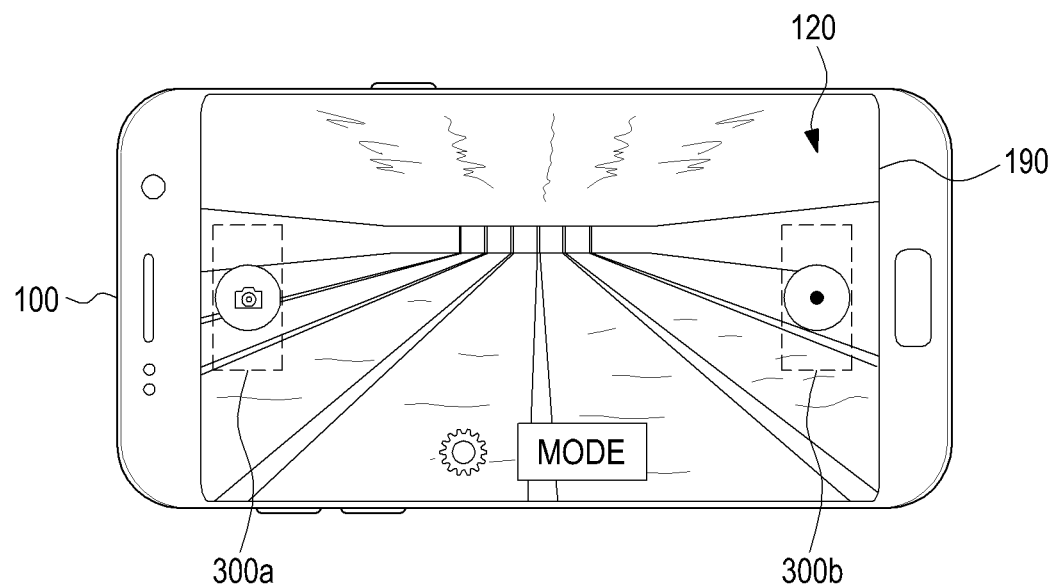
FIGS. 8A, 8B and 8C are diagrams illustrating an example situation in which a basic value of a piezoelectric element is set differently depending on water pressure when an electronic device is located under the water according to an example embodiment of the present disclosure.
Figure 8B:
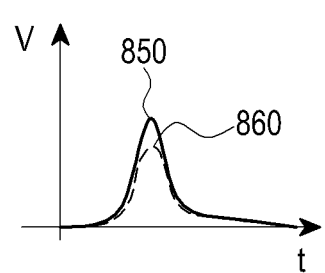
Figure 8C:
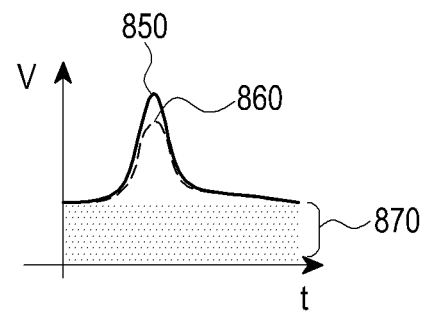

FIGS. 8A, 8B and 8C are diagrams illustrating an example situation in which a basic value of a piezoelectric element is set differently depending on water pressure when an electronic device is located under the water according to an example embodiment of the present disclosure.

Referring to FIG. 8A, the electronic device 100 may display the second user interface 120 on the display 190 when it is determined that the electronic device 100 is located under the water.

According to an embodiment, the electronic device 100 may include one or more piezoelectric elements 300a and 300b. The electronic device 100 may provide the piezoelectric elements 300a and 300b to the right end and the left end of the display 190. The electronic device 100 may display the second user interface 120 in which function execution icons are arranged based on positions of the piezoelectric elements 300a and 300b. Further, the electronic device 100 may arrange icons at positions spaced apart from the piezoelectric elements 300a and 300b, as described above with reference to FIG. 7A.

According to an embodiment, the electronic device 100 may adjust the sensitivity of the piezoelectric element 300 based on a water pressure applied thereto under the water.

For example, the electronic device 100 may determine whether or not the piezoelectric element 300 is touched until a measured water pressure reaches a preset value, as illustrated in FIG. 8B. That is, the electronic device 100 may set a reference value of a voltage generated by the piezoelectric element 300 to be 0V.

According to an embodiment, when the measured water pressure exceeds the preset value during a preset period of time, the electronic device 100 may set the reference value of the voltage generated by the piezoelectric element 300 to be as high as a preset level 870, as illustrated in (c) of FIG. 8. That is, the electronic device 100 may determine the presence or absence of a touch of the user by setting the sensitivity of the piezoelectric element 300 to be high.

Therefore, when the water pressure exceeds the preset value during the preset period of time, the electronic device 100 may recognize that a touch has been made by the user and then execute a corresponding function only when voltage displacement received from the piezoelectric element 300 has a value equal to or higher than a preset level 870.

The electronic device 100 may measure the water pressure using a pressure applied to the piezoelectric element 300. Further, the electronic device 100 may measure the water pressure using, for example, and without limitation, an air-pressure sensor.

The electronic device 100 may further divide a step of increasing the sensitivity of the piezoelectric element 300 according to the water pressure. Although not illustrated, the electronic device 100 may divide the sensitivity of the piezoelectric element 300 into three, four, or more levels according to the water pressure. Therefore, the user may easily use functions of the electronic device 100 even if he/she enters deep water with the electronic device 100.

FIGS. 9A and 9B are diagrams illustrating another example situation in which an electronic device changes a user interface displayed on a display based on an output of a first sensor according to an example embodiment of the present disclosure.

The electronic device 100 may display the first user interface 110 on the display 190. The first user interface 110 may be, for example, a basic application which is initially displayed on a screen when the electronic device 100 is executed.

Referring to FIG. 9A, the first user interface 110 displaying various applications that may be performed by the electronic device 100 may be displayed. The first user interface 110 may display, for example, a search application 911, an Internet application 914, a messenger application 913, a call application 912, an application screen icon 915, and the like on the display 190.

However, the applications that the first user interface 110 displays on the display 190 are not limited thereto. For example, a user may change the types of applications displayed on the screen.

According to an embodiment, the electronic device 100 may include the first sensor (not illustrated) and the second sensor (not illustrated) which is different from the first sensor. The first sensor may be, for example, a capacitive touch display driven by sensing static electricity generated from a user's body. According to an embodiment, the electronic device 100 may include a piezoelectric element as the second sensor.

Referring to FIG. 9B, the electronic device 100 may change the first user interface 110 displayed on the display 190 to the second user interface 120 and display the second user interface 120, based on a result of detection by the first sensor.

For example, when the electronic device 100 enters the water, the capacitive touch display may recognize that a touch occurs in the entire area of the display. At this time, the electronic device 100 may change the first user interface 110 to the second user interface 120 and display the second user interface 120.

The second user interface 120 may include applications which the electronic device 100 may use even when the electronic device 100 is located under the water. For example, the second user interface 120 may display a camera application 921, a music application 922, a screen lock application 923, and the like on the display 190.

Figure 10:
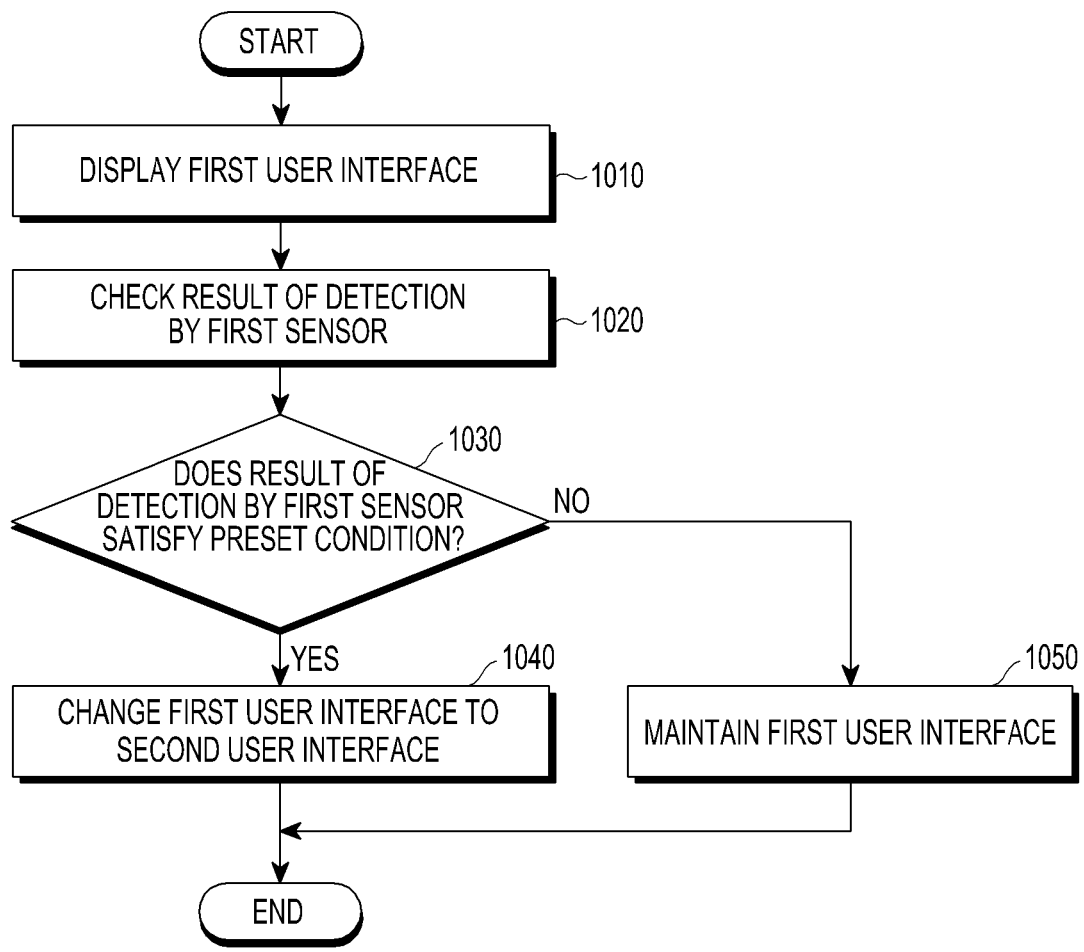
FIG. 10 is a flowchart illustrating an example procedure of changing a user interface displayed on a display based on an output of a first sensor by an electronic device according to an example embodiment of the present disclosure.

FIG. 10 is a flowchart illustrating an example procedure of changing a user interface displayed on a display based on an output of a first sensor by an electronic device according to an example embodiment of the present disclosure.

Referring to operation 1010, the electronic device 100 may display the first user interface. Referring to operation 1020, the electronic device 100 may check a result of detection by the first sensor. The first sensor may be, for example, a capacitive touch display. Referring to operation 1030, the electronic device 100 may check whether the result of detection by the first sensor satisfies a preset situation. For example, the electronic device 100 may check whether a detection result indicating that a touch is input to all positions of the capacitive touch display has occurred.

Referring to operation 1040, when the detection result indicating that a touch is input to all positions of the capacitive touch display has occurred, the electronic device 100 may change the first interface to a second user interface. The electronic device 100 may change the first user information, which has been displayed on the display, to the second user interface.

The second user interface may be a user interface in which execution icons or applications are arranged adjacent to a position of the second sensor. When it is determined that the electronic device 100 is under the water, the electronic device 100 may display the second user interface in which icons are arranged adjacent to a position of the second sensor, which is capable of detecting user input under the water. In addition, the electronic device 100 may display the second user interface displaying applications that the electronic device 100 may use under the water.

According to another embodiment, the electronic device 100 may display the second user interface on the display, instead of displaying the first user interface. For example, when the electronic device 100 is turned on under the water, the electronic device 100 may directly display the second user interface.

Referring to operation 1050, when a detection result indicating that a touch is input to all positions of the capacitive touch display does not occur, the electronic device 100 may maintain the first user interface.

Figure 11:
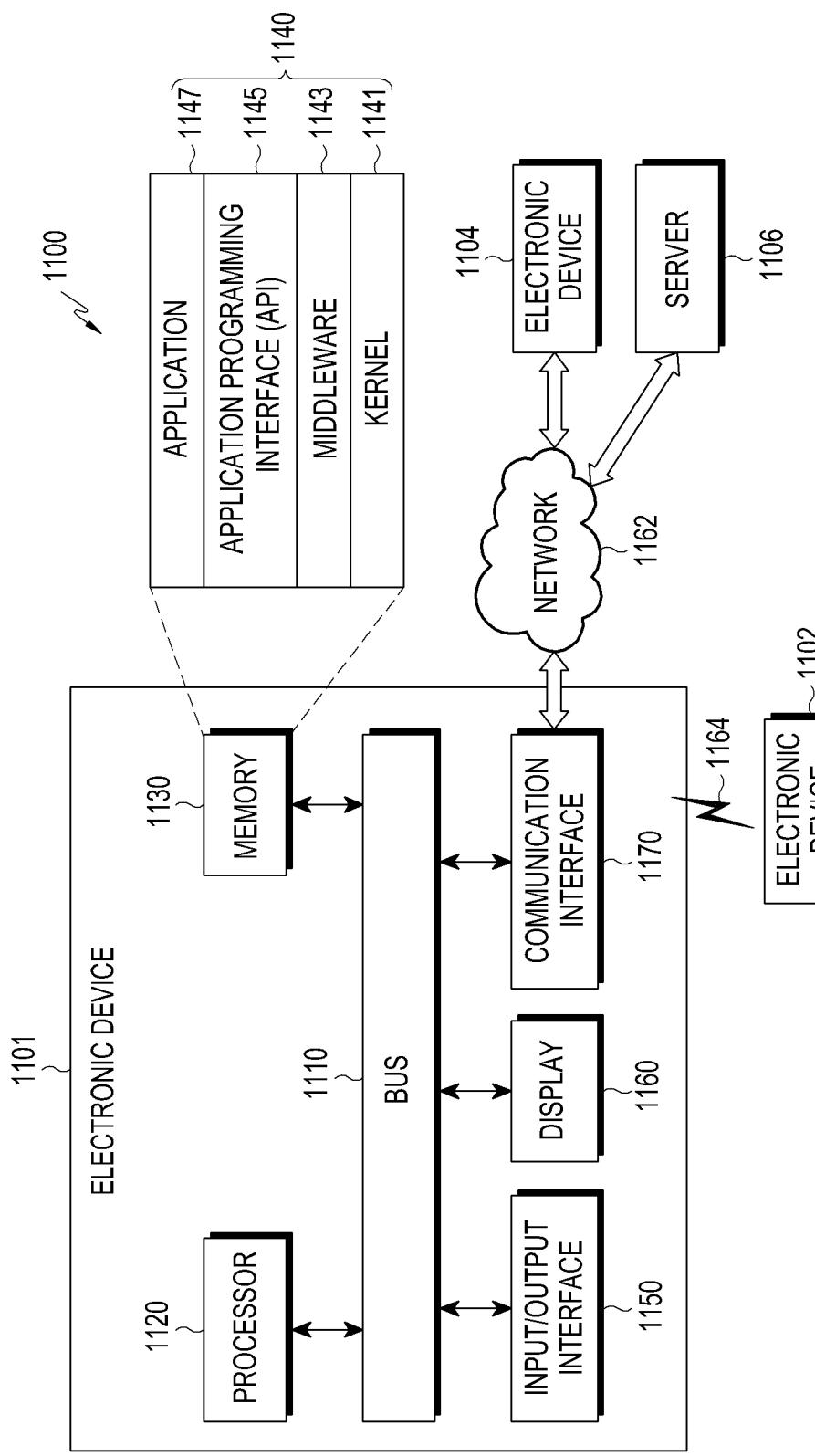
FIG. 11 is a diagram illustrating an example electronic device within a network environment according to various example embodiments of the present disclosure.

Referring to FIG. 11, an electronic device 1101 within a network environment 1100 according to various example embodiments of the present disclosure will be described. The electronic device 1101 may include a bus 1110, a processor (e.g., including processing circuitry) 1120, a memory 1130, an input/output interface (e.g., including input/output circuitry) 1150, a display 1160, and a communication interface (e.g., including communication circuitry) 1170. The electronic device 1101 may include the electronic device 100 of FIG. 1. In some embodiments, the electronic device 1101 may omit at least one of the elements, or may further include other elements.

The bus 1110 may include, for example, a circuit that interconnects the elements 1110 to 170 and transmits communication (e.g., control messages or data) between the elements.

The processor 1120 may include various processing circuitry, such as, for example, and without limitation, one or more of a dedicated processor, a central processing unit, an application processor, and a communication processor (CP), or the like. The processor 1120, for example, may carry out operations or data processing relating to the control and/or communication of at least one other element of the electronic device 1101.

The memory 1130 may include a volatile and/or non-volatile memory.

The memory 1130 may store, for example, instructions or data relevant to at least one other element of the electronic device 1101. According to an embodiment, the memory 1130 may store software and/or a program 1140. The program 1140 may include, for example, a kernel 1141, middleware 1143, an application programming interface (API) 1145, and/or application programs (or "applications") 1147. At least some of the kernel 1141, the middleware 1143, and the API 1145 may be referred to as an operating system. The kernel 1141 may control or manage system resources (e.g., the bus 1110, the processor 1120, or the memory 1130) used for executing an operation or function implemented by other programs (e.g., the middleware 1143, the API 1145, or the application 1147). Furthermore, the kernel 1141 may provide an interface through which the middleware 1143, the API 1145, or the application programs 1147 may access the individual elements of the electronic device 1101 in order to control or manage system resources.

The middleware 1143 may function as, for example, an intermediary for allowing the API 1145 or the application programs 1147 to communicate with the kernel 1141 to exchange data. Furthermore, the middleware 1143 may process one or more task requests, which are received from the application programs 1147, according to priorities thereof. For example, the middleware 1143 may assign priorities for using the system resources (e.g., the bus 1110, the processor 1120, the memory 1130, or the like) of the electronic device 1101 to one or more of the application programs 1147, and may process the one or more task requests. The API 1145 is an interface used by the application 1147 to control a function provided from the kernel 1141 or the middleware 1143, and may include, for example, at least one interface or function (e.g., an instruction) for file control, window control, image processing, character control, or the like. For example, the input/output interface 1150 may forward instructions or data, input from a user or an external device, to the other element(s) of the electronic device 1101, or may output instructions or data, received from the other element(s) of the electronic device 1101, to the user or the external device.

The display 1160 may include, for example, a Liquid Crystal Display (LCD), a Light Emitting Diode (LED) display, an Organic Light Emitting Diode (OLED) display, a Micro Electro Mechanical System (MEMS) display, or an electronic paper display, or the like, but is not limited thereto. The display 1160 may display, for example, various types of content (e.g., text, images, videos, icons, and/or symbols) for a user. The display 1160 may include a touch screen and may receive, for example, a touch, gesture, proximity, or hovering input using an electronic pen or a body part of the user.

The communication interface 1170 may include various communication circuitry and configure communication, for example, between the electronic device 1101 and an external device (e.g., a first external electronic device 1102, a second external electronic device 1104, or a server 1106). For example, the communication interface 1170 may be connected to a network 1162 through wireless or wired communication to communicate with the external device (e.g., the second external electronic device 1104 or the server 1106). Additionally, the communication interface 1170 may establish a short-range wireless communication connection with, for example, and without limitation, the first external electronic device 1102.

The wireless communication may include, for example, cellular communication that uses at least one of LTE, LTE-Advanced (LIE-A), Code Division Multiple Access (CDMA), Wideband CDMA (WCDMA), Universal Mobile Telecommunications System (UNITS), Wireless Broadband (WiBro), Global System for Mobile Communications (GSM), or the like. According to an embodiment, the wireless communication may include, for example, at least one of Wi-Fi, Bluetooth, Bluetooth Low Energy (BLE), ZigBee, Near-Field Communication (NFC), Magnetic Secure Transmission, Radio Frequency (RF), and Body Area Network (BAN). According to an embodiment, the wireless communication may include a GNSS. The GNSS may be, for example, a Global Positioning System (GPS), a Global Navigation Satellite System (GLONASS), a BeiDou navigation satellite system (hereinafter, referred to as "BeiDou"), or Galileo (the European global satellite-based navigation system). Hereinafter, in this document, the term "GPS" may be interchangeable with the term "GNSS". The wired communication may include, for example, at least one of a Universal Serial Bus (USB), a High Definition Multimedia Interface (HDMI), Recommended Standard 232 (RS-232), a Plain Old Telephone Service (POTS), and the like. The network 1162 may include a telecommunications network, for example, at least one of a computer network (e.g., a LAN or a WAN), the Internet, and a telephone network.

Each of the first and second external electronic devices 1102 and 1104 may be of a type that is the same as or a different from that of the electronic device 1101. According to various embodiments, all or some of the operations performed by the electronic device 1101 may be performed by another electronic device or multiple electronic devices (e.g., the electronic device 1102 or 1104 or the server 1106). According to an embodiment, when the electronic device 1101 has to perform some functions or services automatically or in response to a request, the electronic device 1101 may additionally make a request for performing at least some functions relating thereto to another device (e.g., the electronic device 1102 or 1104 or the server 1106), or may make the request for performing at least some functions relating thereto to another device instead of performing the functions or services by itself. Another electronic device (e.g., the electronic device 1102 or 1104 or the server 1106) may execute the requested functions or the additional functions, and may deliver a result of execution thereof to the electronic device 1101. The electronic device 1101 may provide the received result as it is, or may additionally process the received result to provide the requested functions or services. To this end, for example, cloud-computing, distributed-computing, or client-server-computing technology may be used.

Figure 12:
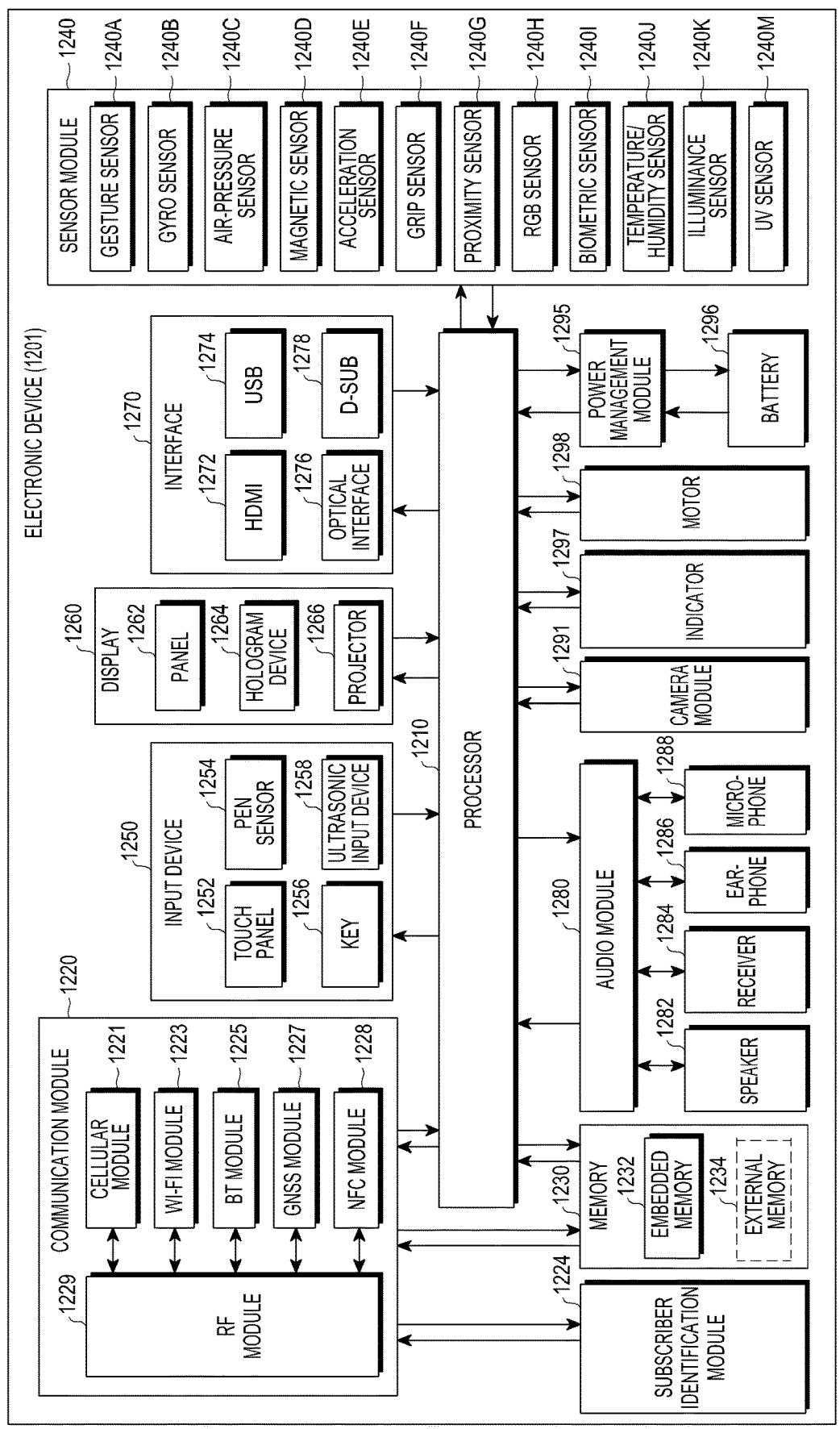
FIG. 12 is a block diagram illustrating an example electronic device according to various example embodiments of the present disclosure.

FIG. 12 is a block diagram illustrating an example electronic device 1201 according to various example embodiments of the present disclosure. The electronic device 1201 may include, for example, all or part of the electronic device 100 of FIG. 1, and all or part of the electronic device 1101 of FIG. 11. The electronic device 1201 may include at least one processor (e.g., including processing circuitry) 1210 (e.g., an AP), a communication module (e.g., including communication circuitry) 1220, a subscriber identification module 1224, a memory 1230, a sensor module 1240, an input device (e.g., including input circuitry) 1250, a display 1260, an interface (e.g., including interface circuitry) 1270, an audio module 1280, a camera module 1291, a power management module 1295, a battery 1296, an indicator 1297, and a motor 1298.

The processor 1210 may include various processing circuitry and control a plurality of hardware or software elements connected thereto and may perform various data processing and operations by driving an operating system or an application program. The processor 1210 may be implemented by, for example, a System on Chip (SoC). According to an embodiment, the processor 1210 may further include a graphic processing unit (GPU) and/or an image signal processor. The processor 1210 may also include at least some (e.g., a cellular module 1221) of the elements illustrated in FIG. 12. The processor 1210 may load, in volatile memory, instructions or data received from at least one of the other elements (e.g., non-volatile memory), process the loaded instructions or data, and store the resultant data in the non-volatile memory.

The communication module 1220 may have a configuration that is the same as, or similar to, that of the communication interface 1170. The communication module 1220 may include various communication circuitry, such as, for example, and without limitation, one or more of a cellular module 1221, a Wi-Fi module 1223, a Bluetooth module 1225, a GNSS module 1227, an NFC module 1228, and an RF module 1229. The cellular module 1221 may provide, for example, a voice call, a video call, a text message service, an Internet service, or the like through a communication network. According to an embodiment, the cellular module 1221 may identify and authenticate the electronic device 1201 within a communication network using the subscriber identification module 1224 (e.g., a SIM card). According to an embodiment, the cellular module 1221 may perform at least some of the functions that the processor 1210 may provide. According to an embodiment, the cellular module 1221 may include a communication processor (CP). According to some embodiments, at least some (e.g., two or more) of the cellular module 1221, the Wi-Fi module 1223, the BT module 1225, the GNSS module 1227, and the NFC module 1228 may be included in one Integrated Chip (IC) or IC package. The RF module 1229 may transmit or receive, for example, a communication signal (e.g., an RF signal). The RF module 1229 may include, for example, a transceiver, a power amp module (PAM), a frequency filter, a low noise amplifier (LNA), an antenna, or the like. According to another embodiment, at least one of the cellular module 1221, the Wi-Fi module 1223, the BT module 1225, the GNSS module 1227, and the NFC module 1228 may transmit or receive an RF signal through a separate RF module.

The subscriber identification module 1224 may include, for example, a card that includes a subscriber identification module, or an embedded SIM, and may contain unique identification information (e.g., an integrated circuit card identifier (ICCID)) or subscriber information (e.g., an international mobile subscriber identity (IMSI)).

The memory 1230 (e.g., the memory 1130) may include, for example, an embedded memory 1232 and/or an external memory 1234. The embedded memory 1232 may include, for example, at least one of a volatile memory (e.g., a DRAM, an SRAM, an SDRAM, or the like) and a non-volatile memory (e.g., a One Time Programmable ROM (OTPROM), a PROM, an EPROM, an EEPROM, a mask ROM, a flash ROM, a flash memory, a hard disk drive, or a Solid State Drive (SSD)). The external memory 1234 may include a flash drive, for example, a compact flash (CF), a secure digital (SD), a Micro-SD, a Mini-SD, an eXtreme digital (xD), a multimedia card (MMC), a memory stick, and the like. The external memory 1234 may be functionally or physically connected to the electronic device 1201 through any of various interfaces.

The sensor module 1240 may, for example, measure a physical quantity or detect the operating state of the electronic device 1201 and may convert the measured or detected information into an electrical signal. The sensor module 1240 may include, for example, at least one of a gesture sensor 1240A, a gyro sensor 1240B, an air-pressure sensor 1240C, a magnetic sensor 1240D, an acceleration sensor 1240E, a grip sensor 1240F, a proximity sensor 1240G, a color sensor 1240H (e.g., a red, green, blue (RGB) sensor), a biometric sensor 1240I, a temperature/humidity sensor 1240J, a light (e.g., illuminance) sensor 1240K, and an ultraviolet (UV) sensor 1240M. Additionally or alternatively, the sensor module 1240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1240 may further include a control circuit for controlling one or more sensors included therein. In some embodiments, the electronic device 1201 may further include a processor configured to control the sensor module 1240 as a part of or separately from the processor 1210, and may control the sensor module 1240 while the processor 1210 is in a sleep state.

The input device 1250 may include various input circuitry, such as, for example, and without limitation, one or more of a touch panel 1252, a (digital) pen sensor 1254, a key 1256, or an ultrasonic input device 1258. The touch panel 1252 may be, for example, at least one of a capacitive type, a resistive type, an infrared type, and an ultrasonic type. Furthermore, the touch panel 1252 may further include a control circuit. The touch panel 1252 may further include a tactile layer to provide a tactile reaction to a user. The (digital) pen sensor 1254 may include, for example, a recognition sheet that is a part of, or separate from, the touch panel. The key 1256 may include, for example, a physical button, an optical key, or a keypad. The ultrasonic input device 1258 may detect ultrasonic waves, which are generated by an input tool, through a microphone (e.g., a microphone 1288) to identify data corresponding to the detected ultrasonic waves.

The display 1260 (e.g., the display 1160) may include a panel 1262, a hologram device 1264, a projector 1266, and/or a control circuit for controlling the same. The panel 1262 may be implemented to be, for example, flexible, transparent, or wearable. The panel 1262, together with the touch panel 1252, may be configured as one or more modules. According to an embodiment, the panel 1262 may include a pressure sensor (or a POS sensor) which may measure the strength of pressure of a user's touch. The pressure sensor may be implemented so as to be integrated with the touch panel 1252 or may be implemented as one or more sensors separate from the touch panel 1252. The hologram device 1264 may show a three dimensional image in the air by using light interference. The projector 1266 may display an image by projecting light onto a screen. The screen may be located, for example, in the interior of, or on the exterior of, the electronic device 1201.

The interface 1270 may include various interface circuitry, such as, for example, and without limitation, one or more of an HDMI 1272, a USB 1274, an optical interface 1276, or a D-subminiature (D-sub) 1278 interface. The interface 1270 may be included in, for example, the communication interface 1170 illustrated in FIG. 11. Additionally or alternatively, the interface 1270 may, for example, include a mobile high-definition link (MHL) interface, a secure digital (SD) card/multimedia card (MMC) interface, or an infrared data association (IrDA) standard interface.

The audio module 1280 may convert, for example, sound into an electrical signal, and vice versa. At least some elements of the audio module 1280 may be included, for example, in the input/output interface 1150 illustrated in FIG. 11. The audio module 1280 may process sound information that is input or output through, for example, a speaker 1282, a receiver 1284, earphones 1286, the microphone 1288, and the like.

The camera module 1291 is a device that can photograph a still image and a moving image. According to an embodiment, the camera module 1291 may include one or more image sensors (e.g., a front sensor or a rear sensor), a lens, an image signal processor (ISP), or a flash (e.g., an LED or xenon lamp).

The power management module 1295 may manage, for example, the power of the electronic device 1201. According to an embodiment, the power management module 1295 may include a power management integrated circuit (PMIC), a charger IC, or a battery or fuel gauge. The PMIC may use a wired and/or wireless charging method. Examples of the wireless charging method may include a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, the remaining charge of the battery 1296 and a voltage, current, or temperature while charging. The battery 1296 may include, for example, a rechargeable battery and/or a solar battery.

The indicator 1297 may display a particular state, for example, a booting state, a message state, a charging state, or the like of the electronic device 1201 or a part (e.g., the processor 1210) of the electronic device 1201. The motor 1298 may convert an electrical signal into a mechanical vibration and may generate a vibration, a haptic effect, or the like. The electronic device 1201 may include a mobile TV support device (e.g., a GPU) that may process media data according to a standard, such as digital multimedia broadcasting (DMB), digital video broadcasting (DVB), media-Flo™, and the like.

Each of the above-described component elements of hardware according to the present disclosure may be configured with one or more components, and the names of the corresponding component elements may vary based on the type of electronic device. In various embodiments, an electronic device (e.g., the electronic device 1201) may omit some elements or may further include additional elements, or some of the elements of the electronic device may be combined with each other to configure one entity, in which case the electronic device may identically perform the functions of the corresponding elements prior to the combination thereof.

Figure 13:
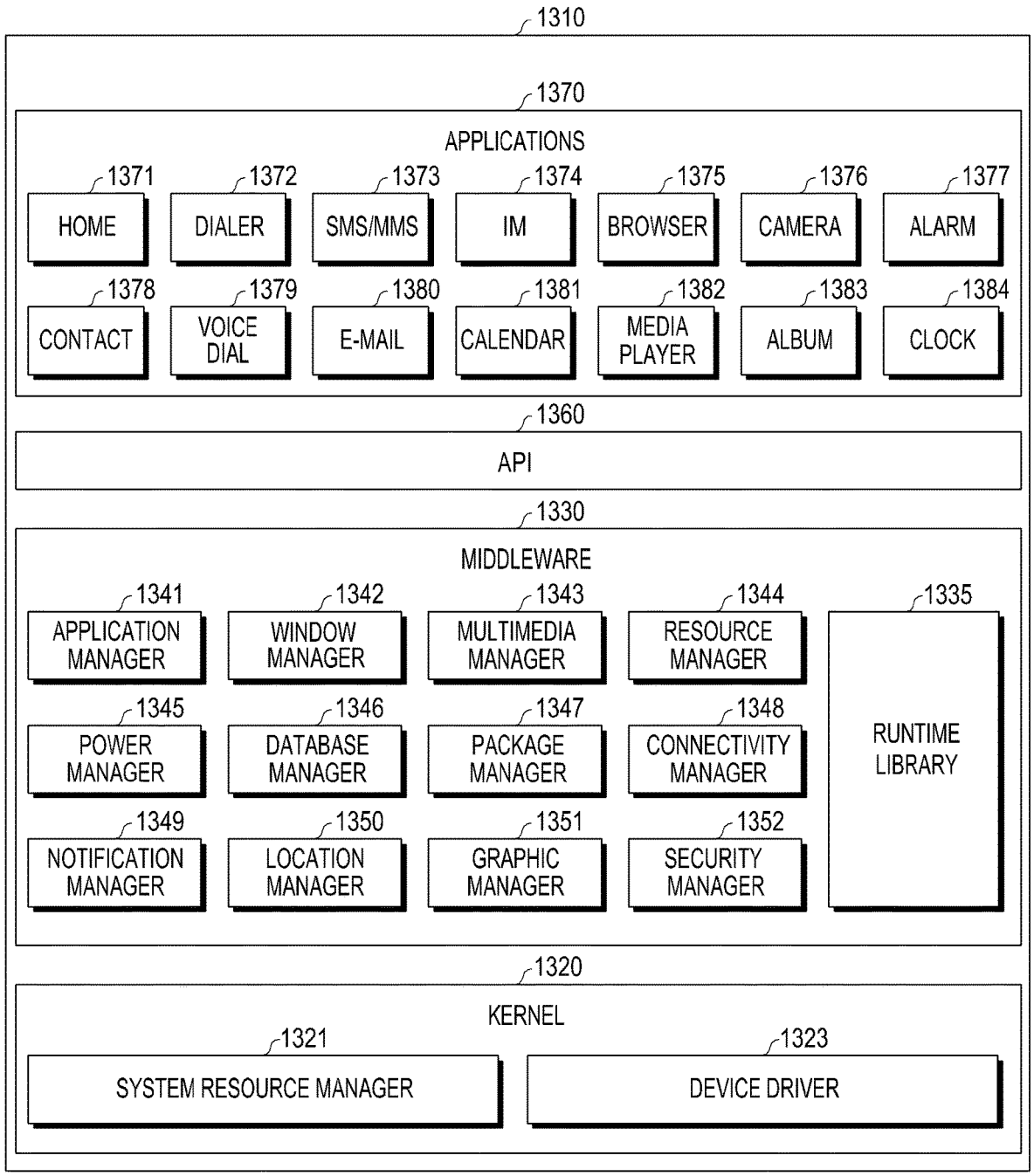
FIG. 13 is a block diagram illustrating an example program module according to various example embodiments of the present disclosure.

FIG. 13 is a block diagram illustrating an example program module according to various example embodiments of the present disclosure. According to an embodiment, the program module 1310 (e.g., the program 1140) may include an Operating System (OS) that controls resources relating to an electronic device (e.g., the electronic device 100 and the electronic device 1101) and/or various applications (e.g., the application programs 1147) that are driven on the operating system. The operating system may include, for example, Android™, iOS™, Windows™, Symbian™, Tizen™, or Bada™.

Referring to FIG. 13, the program module 1310 may include a kernel 1320 (e.g., the kernel 1141), middleware 1330 (e.g., the middleware 1143), an API 1360 (e.g., the API 1145), and/or applications 1370 (e.g., the application programs 1147). At least a part of the program module 1310 may be preloaded on the electronic device, or may be downloaded from an external electronic device (e.g., the electronic device 1102 or 1104 or the server 1106).

The kernel 1320 may include, for example, a system resource manager 1321 and/or a device driver 1323. The system resource manager 1321 may control, allocate, or retrieve system resources. According to an embodiment, the system resource manager 1321 may include a process manager, a memory manager, or a file system manager. The device driver 1323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 1330 may provide a function required by the applications 1370 in common, or may provide various functions to the applications 1370 through the API 1360 so that the applications 1370 may efficiently use the limited system resources within the electronic device. According to an embodiment, the middleware 1330 may include at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, and a security manager 1352.

The runtime library 1335 may include, for example, a library module that a compiler uses in order to add a new function through a programming language while the applications 1370 are being executed. The runtime library 1335 may manage input/output, manage memory, or process an arithmetic function. The application manager 1341 may manage, for example, the life cycles of the applications 1370.

The window manager 1342 may manage GUI resources used for a screen. The multimedia manager 1343 may identify formats required for reproducing various media files and may encode or decode a media file using a codec suitable for the corresponding format.

The resource manager 1344 may manage the source code of the applications 1370 or space in a memory. The power manager 1345 may manage, for example, the capacity or power of a battery and may provide power information required in order to operate the electronic device. According to an embodiment, the power manager 1345 may operate in conjunction with a basic input/output system (BIOS).

The database manager 1346 may, for example, generate, search, or change databases to be used by the applications 1370. The package manager 1347 may manage the installation or update of an application that is distributed in the form of a package file.

The connectivity manager 1348 may manage, for example, a wireless connection. The notification manager 1349 may provide an event (e.g., an arrival message, an appointment, a proximity notification, or the like) to a user. The location manager 1350 may manage, for example, the location information of the electronic device. The graphic manager 1351 may manage a graphic effect to be provided to a user and a user interface relating to the graphic effect. The security manage 1352 may provide, for example, system security or user authentication. According to an embodiment, the middleware 1330 may include a telephony manager for managing a voice or video call function of the electronic device or a middleware module that is capable of realizing a combination of the functions of the above-described elements. According to an embodiment, the middleware 1330 may provide specialized modules depending on the type of operating system. Furthermore, the middleware 1330 may dynamically remove some of the existing elements, or may add new elements.

The API 1360 is, for example, a set of API programming functions, and may be provided with different configurations depending on the operating system. For example, in the case of Android or iOS, one API set may be provided for each platform, and in the case of Tizen, two or more API sets may be provided for each platform.

The applications 1370 may include, for example, one or more applications that can perform functions such as home 1371, a dialer 1372, SMS/MMS 1373, instant messaging (IM) 1374, a browser 1375, a camera 1376, an alarm 1377, contacts 1378, voice dialing 1379, e-mail 1380, a calendar 1381, a media player 1382, an album 1383, a clock 1384, or the like. Additionally, though not shown, the applications 1370 may include various other applications, including, for example, health-care applications (e.g., for measuring exercise quantity or blood glucose), environment information (e.g., atmospheric pressure, humidity, or temperature information) provision applications, and the like. According to an embodiment, the applications 1370 may include an information exchange application that can support the exchange of information between the electronic device and an external electronic device. The information exchange application may include, for example, a notification relay application for relaying particular information to an external electronic device or a device management application for managing an external electronic device. For example, the notification relay application may relay notification information generated in the other applications of the electronic device to an external electronic device, or may receive notification information from an external electronic device and provide the received notification information to a user. The device management application may, for example, install, delete, or update an application operating on an external electronic device or functions (e.g., turning on/off of the external electronic device itself (or some components thereof) or adjusting the brightness (or resolution) of the display) of the external electronic device communicating with the electronic device. According to an embodiment, the applications 1370 may include applications (e.g., a health care application of a mobile medical appliance) that are designated according to the attributes of an external electronic device. According to an embodiment, the applications 1370 may include applications received from an external electronic device. At least some of the program module 1310 may be implemented (e.g., executed) by software, firmware, hardware (e.g., the processor 1210), or a combination of two or more thereof and may include a module, a program, a routine, an instruction set, or a process for performing one or more functions.

The term "module" as used herein may include a unit comprising hardware, software, and/or firmware, and any combinations thereof, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, and without limitation, one or more of a dedicate processor, a CPU, an Application-Specific Integrated Circuit (ASIC) chip, a Field-Programmable Gate Array (FPGA), or a programmable-logic device, which has been known or is to be developed in the future, for performing certain operations.

At least some of the devices (e.g., modules or functions thereof) or methods (e.g., operations) according to various embodiments may be implemented by instructions which are stored in a computer-readable storage medium (e.g., the memory 130) in the form of a program module. The instructions, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instructions may include code compiled by a complier or code that may be executed by an interpreter. In modules or program modules according to various embodiments, at least one or more of the elements described above may be included, some of the elements may be omitted, or other elements may be further included. Operations performed by a module, a programming module, or other elements according to various embodiments may be executed sequentially, in parallel, repeatedly, or in a heuristic manner. At least some operations may be executed according to another sequence or may be omitted, or other operations may be further included.

While the disclosure has been described with reference to various example embodiments thereof, it will be understood that the various example embodiments are intended to be illustrative, not limiting, and those skilled in the art will understand that various modifications, variations and alternatives may be made without departing from the true spirit and full scope of the disclosure as defined by the appended claims and their equivalents.

What is claimed is:

1. An electronic device comprising:
   a first sensor for sensing a pressure, disposed in a first position within the electronic device;
   a second sensor for sensing the pressure, disposed in a second position within the electronic device;
   a touch screen; and
   a processor configured to:
   control the touch screen to display a first user interface,
   control the touch screen to display a second user interface including a first icon which is on a first portion of the touch screen corresponding to the first position, a second icon which is on a second portion of the touch screen corresponding to the second position, and a third icon which is on a third portion of the touch screen different from the first portion and second portion, based on detecting that the electronic device is under water via the touch screen,
   identify whether a difference between a first pressure sensed via the first sensor and a second pressure sensed via the second sensor is greater than a threshold value, when an input to the touch screen is received while the electronic device is under water, based on identifying that the difference is greater than the threshold value:

based on identifying that a first pressure sensed via the first sensor is greater than a second pressure sensed via the second sensor when the electronic device is under water, provide a first function related to the first icon, and based on identifying that the second pressure sensed via the second sensor is greater than the first pressure sensed via the first sensor when the electronic device is under water, provide a second function related to the second icon;

based on identifying that the difference is less than the threshold value:

provide a third function related to the third icon.

2. The electronic device of claim 1, wherein the touch screen includes a touch panel configured to recognize a touch, and each of the first sensor and the second sensor includes at least one touch sensor configured to use a piezoelectric element.

3. The electronic device of claim 2, wherein the processor is configured to increase a sensitivity with which the piezoelectric element recognizes a user's touch when a detection value of a touch sensor using the piezoelectric element exceeds a preset value during a preset period.

4. The electronic device of claim 2, wherein the second user interface includes at least one of execution screen related to a camera application, an album application, execution screen related to an album application, or execution screen related to a music reproduction application.

5. The electronic device of claim 1, wherein a number of function execution icons displayed by the first user interface is greater than a number of function execution icons displayed by the second user interface.

6. A method for controlling an electronic device comprising a first sensor, a second sensor and a touch screen, the method comprising:

displaying, on the touch screen, a first user interface;

displaying, on the touch screen, a second user interface including a first icon which is on a first portion of the touch screen corresponding to a first position within the electronic device at which the first sensor for sensing a pressure is disposed, a second icon which is on a second portion of the touch screen corresponding to a second position within the electronic device at which the second sensor for sensing the pressure is disposed, and a third icon which is on a third portion of the touch screen different from the first portion and second portion, based on detecting that the electronic device is under water via the touch screen;

identifying whether a difference between a first pressure sensed via the first sensor and a second pressure sensed via the second sensor is greater than a threshold value, when an input to the touch screen is received while the electronic device is under water;

based on identifying that the difference is greater than the threshold value:

based on identifying that a first pressure sensed via the first sensor is greater than a second pressure sensed via the second sensor when the electronic device is under water, providing a first function related to the first icon; and based on identifying that the second pressure sensed via the second sensor is greater than the first pressure sensed via the first sensor when the electronic device is under water, providing a second function related to the second icon, based on identifying that the difference is less than the threshold value:

providing a third function related to the third icon.

7. The method of claim 6, wherein the touch screen includes a touch panel configured to recognize a touch, and each of the first sensor and the second sensor includes at least one touch sensor configured to use a piezoelectric element.

8. The method of claim 7, further comprising increasing a sensitivity with which the piezoelectric element recognizes a user's touch when a detection value of a touch sensor using the piezoelectric element exceeds a preset value during a preset period.

9. The method of claim 7, wherein the second user interface is includes at least one of an execution screen related to a camera application, an execution screen related to an album application, or an execution screen related to a music reproduction application.

10. The method of claim 6, wherein a number of function execution icons displayed by the first user interface is greater than the number of function execution icons displayed by the second user interface.

11. A non-transitory computer readable storage medium having stored thereon instructions which, when executed by a processor, cause an electronic device comprising a touch screen, a first sensor, and a second sensor to perform operations comprising:

displaying, on the touch screen, a first user interface;

displaying, on the touch screen, a second user interface including a first icon which is on a first portion of the touch screen corresponding to a first position within the electronic device at which the first sensor for sensing a pressure is disposed, a second icon which is on a second portion of the touch screen corresponding to a second position within the electronic device at which second first sensor for sensing the pressure is disposed, and a third icon which is on a third portion of the touch screen different from the first portion and second portion, based on detecting that the electronic device is under water via the touch screen;

identifying whether a difference between a first pressure sensed via the first sensor and a second pressure sensed via the second sensor is greater than a threshold value, when an input to the touch screen is received while the electronic device is under water;

based on identifying that the difference is greater than the threshold value:

based on identifying the first pressure sensed via the first sensor is greater than a second pressure sensed via the second sensor when the electronic device is under water, providing a first function related to the first icon; and based on identifying that the second pressure sensed via the second sensor is greater than the first pressure sensed via the first sensor when the electronic device is under water, providing a second function related to the second icon, based on identifying that the difference is less than the threshold value:

providing a third function related to the third icon.

* * * * *